July 12, 1966 O. BROWN 3,260,529

MULTI-FUNCTIONAL PHONOGRAPH

Filed June 13, 1949 5 Sheets-Sheet 1

Owen Brown
INVENTOR.

July 12, 1966 O. BROWN 3,260,529

MULTI-FUNCTIONAL PHONOGRAPH

Filed June 13, 1949 5 Sheets-Sheet 2

Otto Brown

INVENTOR.

July 12, 1966 O. BROWN 3,260,529

MULTI-FUNCTIONAL PHONOGRAPH

Filed June 13, 1949 5 Sheets-Sheet 3

Oscar Brown
INVENTOR.

July 12, 1966 O. BROWN 3,260,529

MULTI-FUNCTIONAL PHONOGRAPH

Filed June 13, 1949 5 Sheets-Sheet 4

INVENTOR.

July 12, 1966 O. BROWN 3,260,529

MULTI-FUNCTIONAL PHONOGRAPH

Filed June 13, 1949 5 Sheets-Sheet 5

INVENTOR.

United States Patent Office 3,260,529
Patented July 12, 1966

3,260,529

MULTI-FUNCTIONAL PHONOGRAPH

Owen Brown, 2516 S. Catalina Ave.,
Los Angeles, Calif.

Filed June 13, 1949, Ser. No. 98,857
22 Claims. (Cl. 274—10)

This application is a continuation-in-part of application Serial No. 589,322, filed April 20, 1945, now abandoned, which is in turn a continuation-in-part of application Serial No. 367,986, filed November 30, 1940, now abandoned.

My invention comprises a new and fully integrated phonographic system.

More expressly, it consists of record-changing and record-playing instrumentalities, records therefor, and record handling, record shipping and record library facilities believed to represent a distinct advance in the art.

The invention, originally filed under the title of Multiphone With Auxiliaries, features special disc type records, although many elements of existing records, as well as of existing phonographs are incorporated. While several important components are disclosed which are new to the related art it may be stated that the present system is derived in part from my prior co-pending case entitled "Phonographic Apparatus," Serial No. 589,322, entered April 20, 1945, as a continuation-in-part of a yet prior patent entry, Serial No. 367,986, called Apparatus for Handling Disc Phonograph Records and the latter bearing the file date of Nov. 30, 1949. Said "Phonographic Apparatus," in its turn, was allowed to expire in favor of the present more inclusive system.

*General objectives*

In respect to the present versatile structures, certain objects of the invention can be readily understood by a brief mention of particular results which are accomplished therewith. Thus:

(1) My relatively simple invention in one embodiment thereof, makes possible the direct, uninterrupted transcription of a musical, oratorical or monologued literary production or sequence from one side of a given disc record to the other, and from one such record to another thereof, without the aid of auxiliary attachments exemplified by wire recorder-transcribers and the like and which do not, in reality, accomplish a like direct transcriptive result from record discs; as see Patent No. 2,462,435 to Robert E. Stanton. Patent No. 897,765 to George Morin is another case in point.

(2) By option, however, another species may be employed to transcribe disc records—without turning them over—from side to side and from record to record of a given sequence, with a skip therebetween of only an exceedingly brief fractional part of a second, as contrasted to existing records and instruments (at the file date hereabove) wherewith the intervening sound gaps consume up to ten seconds or more.

(3) It makes possible the continuous storage and operation of special groups of disc records, whether played individually selectively or fully automatically, without any one of the records ever being contacted by human hands; and, in consequence, without finger-marking and its usually inevitable concomitant: dust collection and an accumulative gritty abrasive action within the sound grooves, resulting in continuous wear and tear on delicate reproductive styluses and impairment of the original tone quality of modern recordings.

(4) Concurrently, it also enables the operator to manually pick up a closed record magazine or container in which a given record group is stored and, then, merely set the whole of it, including both container and records in unitary form, upon the multifunctional mechanism. Whereupon, said mechanism is automatically started without other actuation and the records played continuously. They may be so played successively automatically or individually selectively as elected; the group being thence entirely re-inclosed within the storage container, on the phonograph instrument and automatically, by the machine itself. Moreover, said machine is automatically stopped at the end of a sequence and need not continue repeating the last record played.

(5) It enables a selected individual record, resting in any known orderly file location within a particular storage group thereof, to be quickly selectively segregated from the remainder of such a group and—without turning it over—thence automatically transcribed on either its upper or its lower side, or, as predetermined, on both its upper and its lower sides; and any pre-selected other record or records of such a group may be so segregated from the momentarily unselected remainder thereof and thus individually reproduced, followed by the automatic re-filing of the whole group inside the container and stopping of the instrument. According to a modified version, however, whereby to accommodate certain existing or perhaps partly converted record players, over to my preferred system, may be facilitated by a brief manual operation, amounting to little more than the instantaneous repossession of the re-closed and re-loaded container for its normal removal from the instrument.

(6) It makes possible the loading of a group of so-called "D–M" records, such as an operatic or symphononic series, directly to existing phonographs, while resting inside their closed container, and each of the A sides of the records played in sequence, followed by the practically instantaneous manual recovery and transposition of the half-played records and their accurate redisposal on the instrument as a coaxial group to play the B sides thereof in sequence, and their automatic re-filing within the reclosed container as aforesaid. On the disclosed fully automatic machines, such records can be played in non-skip continuity, and without manual reversal.

(7) It makes possible the original filing of several elected small groups—such as 4-movement symphonies impressed on both sides of only two record discs—within a single container dimensioned to hold several such groups or dualities, whereby any elected group may be quickly selectively segregated from the momentarily unselected remainder thereof and this group played on both its upper and its lower sides, automatically, and prior to normal atuomatic re-filing as aforesaid, in the orderly known position which it had previously occupied within the container.

(8) It enables a series of disc records, of the preferred type disclosed, to be initially made as masters, and thence reproduced as positives, in such co-timed relations to one another as to be subsequently transcribed in continuity according to phonographic instrumentalities adapted to both drive and to reproduce such records in positive synchronization; the thus conformed records, however, being readily playable on other types of existing phonograph instruments without respect to said synchronous feature.

(9) It enables a group of such preferred records to be filed, face to face within a particular container therefor, and to be thus handled on and by the instrument proper, without one sound track area of a record ever contacting and/or scraping against another thereof—as with prior records. And such records may, by option, be produced to accommodate existing automatic record-changers having laterally disposed slicer blades or camming devices adapted to engage the successively lowermost, or each lowermost and the next lowermost, of a group to be transposed and played according to prior standards of the phonograph industry.

(10) The invention also makes possible the filing of individual record groups within each of a library of containers therefor, which each container serves: (a) as the record storage repository; (b) as the means to load the records to the multifunctional machine for either fully automatic or selective rendition; (c) as means for unloading the records therefrom, in orderly re-filed positions, following a playing sequence; (d) as means for quickly stacking or unstacking the individual containers for immediate access to the selected container of a particular stacked group, occupying an *irreducible minimum of storage space* on a bookshelf, a radio-console cabinet shelf or in plain sight upon the top of such a console as an attractive ornament; and (e) as means whereby a substantial number of containers, weighing in themselves but a fraction of the weight of comparable record albums and occupying substantially much less space, may be quickly assembled on a carrier device for their handy transportation from one location to another. Such containers may be initially utilized as excellent shipping carriers for made-up "magazine" or so-called "phonofile" sets, as formerly detailed copendingly. And this multiplicity of functions is entirely in addition to their use in starting and stopping the multiphone machines as aforesaid.

As to how these unique results and obvious other objectives are accomplished, reference will now be made, first, to the accompanying drawings, wherein lead-line numerals relate to like components throughout. In numerical order—

FIG. 1, a fragmental, partially broken open front elevation, shows one preferred adaptation of a well-known and quite lately announced phonograph instrument, whereby to readily accommodate therein certain features of my multifunctional system; or whereby, optionally, such features can in large measure be accommodated without structural alteration in such existing phonographs.

FIG. 2, another fragmental and partially broken open front elevational view, shows a preferred type of machine which incorporates elements seen in the simplified device of FIG. 1, the tone arm and pick-up members being presented schematically.

Figures 2, 3, 4:
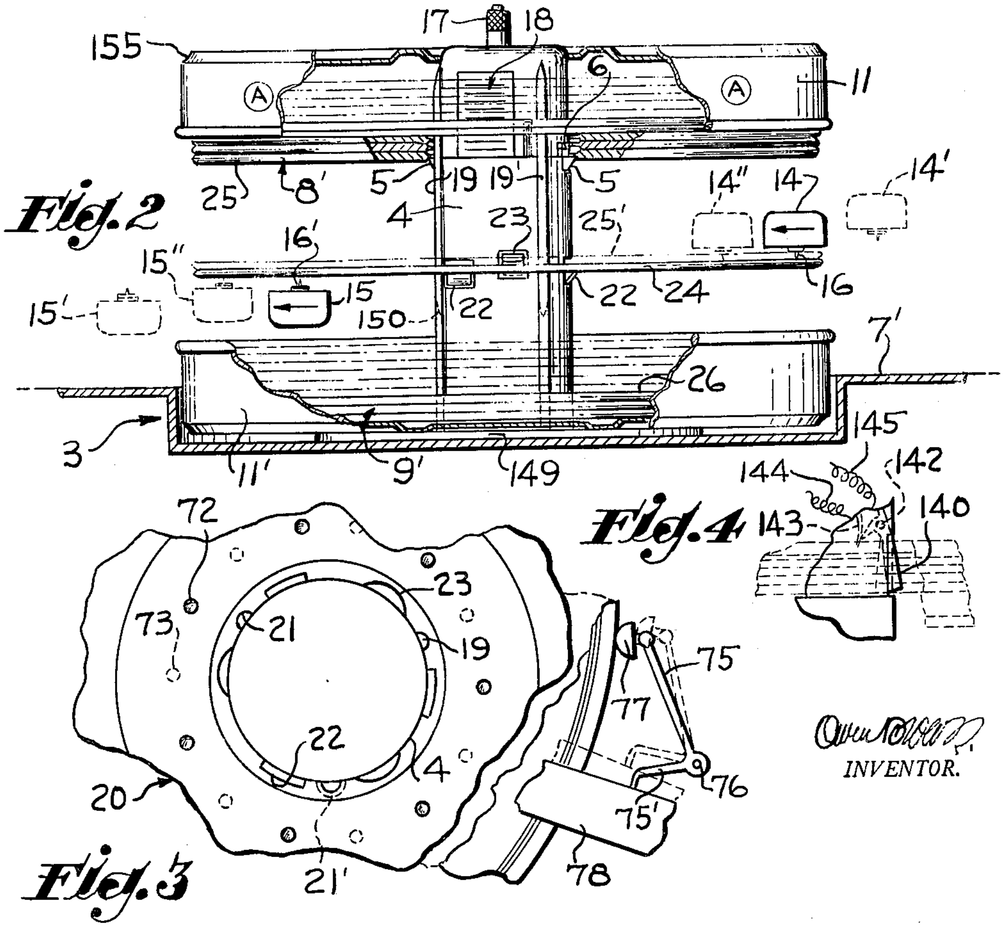
FIG. 3 is the fragmental plan of certain mechanism shown in FIG. 2, and including optional features of a new type of disc record applicable to the record-players of either FIG. 1 or FIG. 2, for example. A further option—not preferred—is given therein at the right.
FIG. 4 is a brief, partially schematic fragment, in side elevation, wherein is depicted a circuit-closing and circuit-opening device for automatically starting and stopping the record-changer mechanism of FIG. 1, for example.
Figures 5, 6, 7, 8, 9, 10:
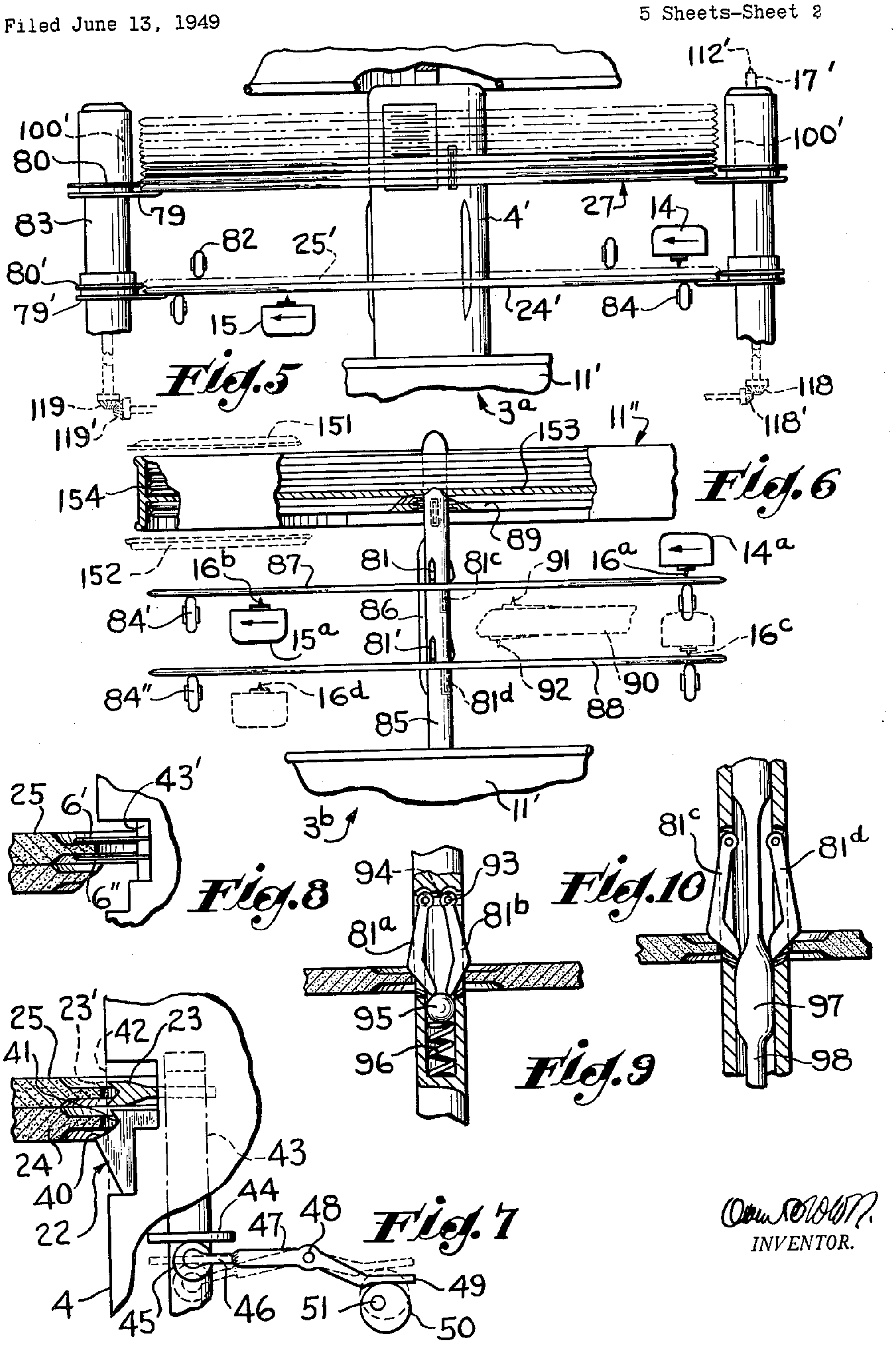

FIG. 5, a fragmental and partially schematized front elevation, shows a modified embodiment of the apparatus of FIG. 2 adapted to transpose individual records by one conventional kind of laterally disposed record-displacing means, and including adapted mechanism for selectively segregating individual records—the latter device to be further detailed.

FIG. 6, a fragmental, partially schematic, front elevational view, is that of a further modification of the instrument first shown in FIG. 2.

FIG. 7, also fragmental and also largely schematic, is a side elevation of certain record-displacing means which relate particularly to the embodiment of FIG. 2.

FIG. 8 is comparable to FIG. 7 but shows only one alternative type of record-engaging and record-releasing means applicable to said FIG. 2 machine.

FIG. 9, a vertical elevation, represents a broken away fragment of the spindle member of FIG. 6, but modified in that, for the avoidance of unduly complicating the small drawing, only a duality of record-latching members is shown instead of the preferred triality thereof to be further explained.

FIG. 10 is the view of mechanism comparable to that seen in FIG. 9; being a modified version thereof for performing additional functions.

Figures 11, 12, 13, 14, 15, 16, 17, 18, 19, 20, 21, 22:
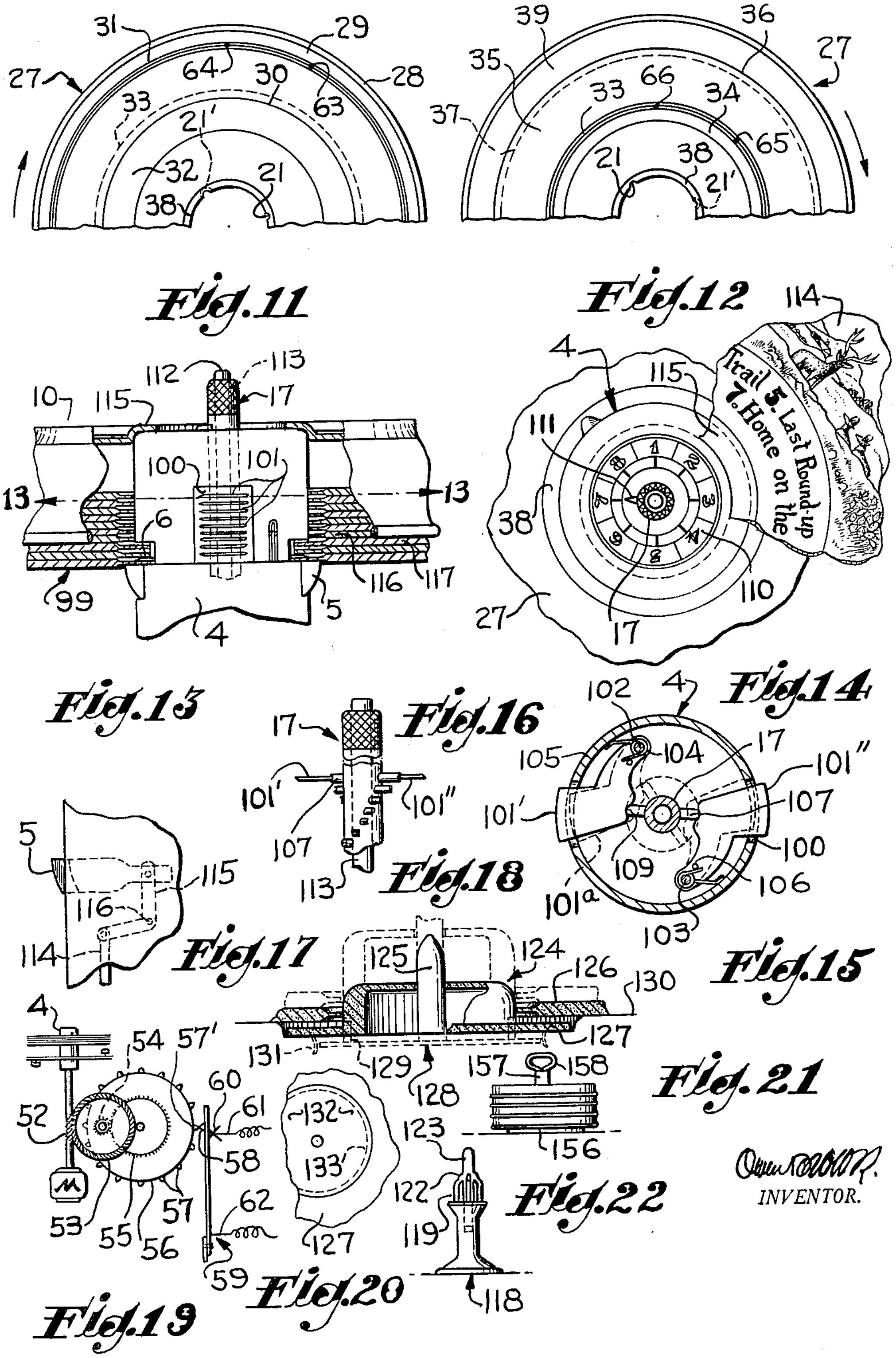

FIG. 11 is another fragmental plan view of a typical record disc, according to the invention, the A side being uppermost.

FIG. 12 is the fragmental plan view of the record disc of FIG. 11, showing the B side uppermost.

FIG. 13 is a partially broken open, fragmental view of an overside upper spindle member, with record stack and inverted container device in combination, whereby selected records may be segregated and selectively played. Obviously, it is a front elevation.

FIG. 14 is a fragmental plan of the upper spindle member of FIG. 13, with a record, record-container, and certain auxiliary indicia elements in combination.

FIG. 15 is a broken open plan of the upper spindle member of FIGS. 13 and 14, which may be taken along the line 13—13 of FIG. 13.

FIG. 16 shows a fragmental portion of the mechanism of FIG. 15 viewed in side elevation.

FIG. 17, a fragmental side elevation, shows a modification of the record-displacing mechanism of FIG. 7, for instance, designed to accommodate the record-selecting device of FIGS. 13 to 16.

FIG. 18 shows an adapter device, in broken open elevation, employed when the record of FIGS. 11 and 12 is to be transcribed on other phonographs for manual playings.

FIG. 19, a brief schematic elevational view, illustrates one type of mechanism for coordinating the record-transcribing apparatus of the machine with the non-skip type of record therefor.

FIG. 20, an elevational fragment, depicts an adapter of another type.

FIG. 21 shows a typical self-nested stack of record-containers in assembly with a handy carrier device therefor.

FIG. 22 depicts a manual adapter which could be utilized where required.

Figures 23, 24, 25:
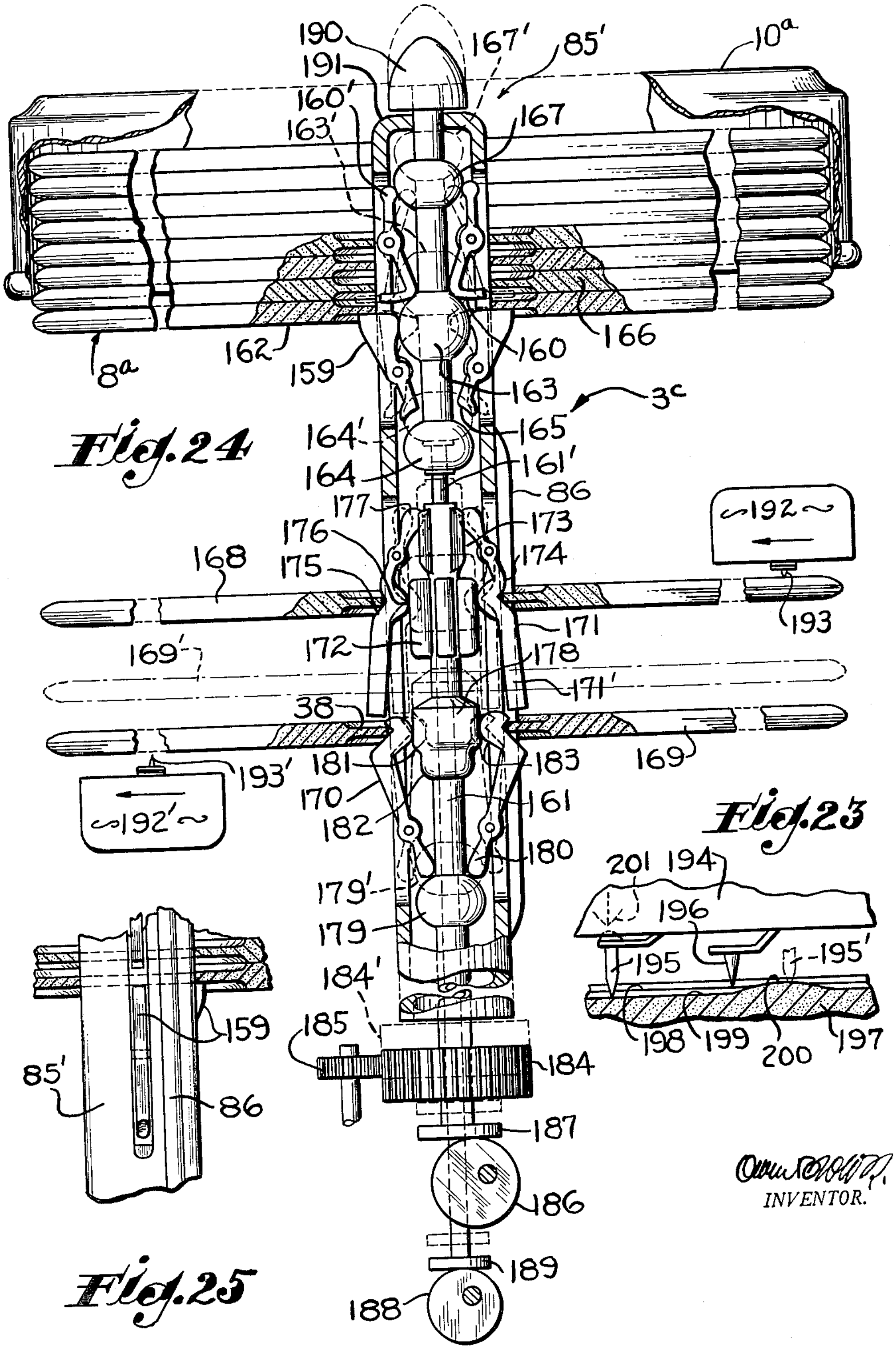

FIG. 23 is the fragmental side elevation of a tone-arm having two independently mounted pickup needles, for contacting respective record grooves simultaneously.

FIG. 24 shows a variant form of the record-player of FIG. 6. The view is a fragmental front elevation and in part schematic.

FIG. 25 is an elevational fragment of FIG. 24, and

Figure 26:
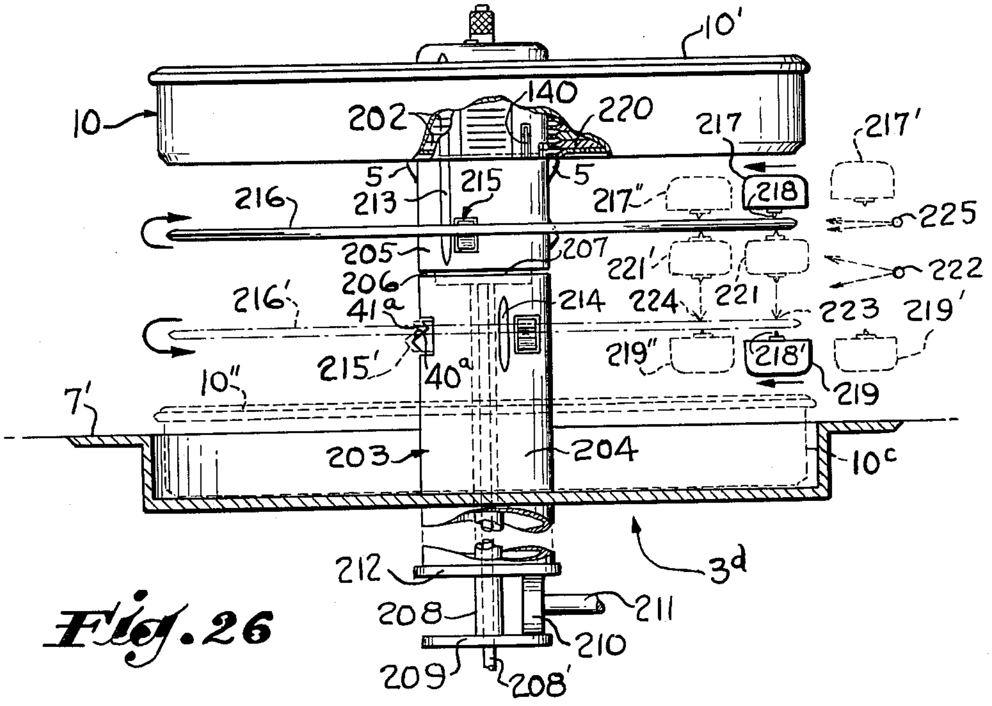

FIG. 26, a front elevation, shows a transitory type of multifunctional machine.

*The integrated system*

As foretold earlier, the major components of the present system include the so-called multifunctional instruments, records therefor, and container devices therefor having a considerable plurality of utilities. The fact that said records and said containers may, with or without adaptation, be utilized on existing phonographs is of course but incidental and indicative of their exceptional versatility.

Figure 1:
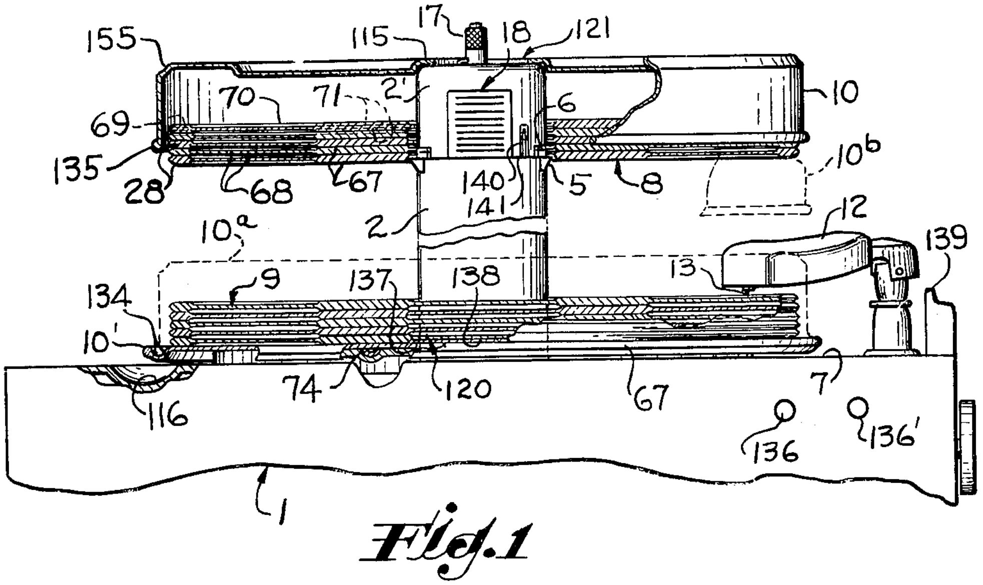

As one preferred form of machine bears a close superficial resemblance to a recently announced automatic phonograph, certain salient features common to both will be recognized in FIGS. 1 and 2 of the drawings. These will therefore be described first.

The machine 1 of FIG. 1 has the oversize spindle or center post 2, while machine 3 of FIG. 2 has the similar but modified spindle post 4. According to both views, a record stack is initially received and supported upon retractable right and left separator shelves 5, which may be identical in both structures. And said shelves cooperate with right and left slicer blades or knives 6 thereabove, which may also be of like construction.

Such devices need not be fully detailed here, since already well known to the art and quite graphically shown and described in the RCA Victor Service Data sheet No.

5, issued by the Radio Corporation of America, 30 Rockefeller Plaza, New York City, to explain its RP–168 series of record changers: which see for all information bearing on the present disclosures wherein like or similar parts therein are adaptable to the hereafter described instruments.

Other features in common, as modified or not, are the respective motor boards 7 and 7′, upper record stacks 8 and 8′, lower record stacks 9 and 9′, container elements 10 and 10′ in the upper view and container elements 11 and 11′ in the lower view; the last named, element 11′, being merely a duplicate of inverted element 11 in an upright position. The machine 1, FIG. 1, has the tone-arm 12 with jewel pickup stylus 13, while machine 3 of FIG. 2 is provided with a duality of special upper and lower tone-arms 14 and 15 haivng pickup styluses 16 and 16′. The uppermost knobs 17 and selector blade assemblies 18, which are here generally shown in both FIG. 1 and FIG. 2, will be duly explained with reference to the more specific exhibits of FIGS. 13 to 16 inclusive.

While the somewhat simpler machine of FIG. 1, along with existing phonographs having record-changers of the aforesaid RP–168 type, may readily employ one or more of my novel accessories—more particularly, the adaptable records and containers—their utility in this manner will best be understood following a further description specific to the machine 3 of FIG. 2.

It would be unprofitable, and quite unnecessary, to show or to dilate upon the exceedingly complicated instrumentalities which are normally housed below the motor board 7′, including those which extend upwardly therefrom into the interior of the spindle or post 4 for operation of shelves 5 and blades or knives 6; these now well known components being, by convenience, according to said R–P168 record-changers of a standard make.

*Salient features*

A first radical departure from standard construction, however, is seen in the form of externally disposed splines 19; these, according to one mode of operation, being in triplicate and at precisely equidistantly spaced locations—as see also the plan view of FIG. 3. According to at least one other mode of operation, however, but a single spline 19′, for example, is employed.

One function of a spline or splines 19 is to receive, in keying relation, the special type of record, exemplified by disc 20 of FIG. 3; each of which discs has the complementary axial key-slots 21—or only a single slot 21′, as hereafter clarified—the triplicate arrangements shown being provided on account of the relatively large diameter of the spindle 4, whereby to insure somewhat more instantaneous interlocking relations between splines and key-slots when a record stack is loaded normally to the machine from a container 11, for illustration.

One-slot records, while not absolutely essential, are preferred for operation according to the first of the techniques to be explained and could, to be sure, be utilized in each instance.

A further radical departure from prior phonographs consists in a second set of record supports or shelves 22, which are retractively carried lower down on the spindle 4 in conjunction with record-holding and—by option—lowering means in the preferred similar form of V-jaw grips 23; these, too, being extendable inwardly and outwardly through small windows, substantially as indicated. And whereas, if desired, the respective upper shelves and blades 5 and 6 may be in right and left duplicates, according to standard design, it is preferable that the somewhat comparable and intercooperative members 22 and 23 shall each be disposed as a threesome thereof; and each of these is also preferably spaced equidistant from the like others of the respective threesomes—as again see FIG. 3.

In this latter view, incidentally, the upper assemblies comprising shelves 5 and blades 6 of FIG. 2 have been arbitrarily omitted for greater clarity; likewise other features including and associated with the said knob 17, to be detailed later.

For a better understanding of elements 22 and 23, a further description of the same will be given shortly with reference to the detail of FIG. 7, as in general complemented by FIG. 2. Thus, in the latter view, it is observed that a record stack has been deposited on the spindle 4, from the inverted upper container member 11, and is supported by right and left upper shelves 5, 5; from which shelves several of the records have already traveled downward to and through the lower elements 22 and 23 to the positions of post-played records 9′ within the lower container member 11′.

It is within the capabilities of record-player 3 to play such records either individually-selectively or automatically, on both obverse and reverse sides thereof; and for present ends it will be assumed that the record 24 is to be transcribed on both A and B sides without turning it over; also, that a next succeeding record 25 is to be likewise transcribed.

Moreover, in accord with one important technique, it is further assumed that a musical recording on record 24 is to be rendered non-skip from A side B side and that record 25 thereabove, in addition to being thus also played non-skip from side to side, following record 24, contains on its A side a continuation of a musical sequence which carries over from the lowermost or B side of record 24 to at least the topmost side of record 25; which sequence is to be transcribed in unbroken continuity, or substantially so, from one record disc to the other. It is meant by "at least" that the sequence may then continue through the remainder of the unplayed records.

I accomplish this objective quite simply. The general procedure (without burdening this explanation with sundry superfluous details within the long known skills of the art) is to first operate the changer mechanism by means of which record 24 is transposed from the upper stack 8′ to the intermediary position here shown; and while it, too, may provide a non-skip continuation of a musical sequence carried over from the previously played record 26, for example, the detailed operations will, for the present, be confined solely to records 24 and 25.

On arrival of record 24 upon the shelves 22, the precisely synchronized arm 14 moves normally automatically to within the confines of the record circle from its former stand-by position 14′, and, hence, to landing or alighting position shown adjacent the record's periphery. Stylus 16, at this time, can normally contact a run-in groove (to be further explained) which carries it quickly into the sound grooving; and at that instant the continuous automatic sequence begins. See, however, later more detailed comment on this phase of the operation, with the omission of run-in-grooving.

*The multifunctional record*

In order to clearly perceive what follows thereafter, attention is momentarily directed to FIG. 11, wherein is shown the A side of one typical, preferred type of record 27.

According to this particular record structures, the peripheral area 28 may be a raised annular portion, the functions of which will be given later relative to other figures of the drawings. The adjacent area 29 may be partially occupied by a suitably configured run-in groove (not actually shown in the small drawing), followed by the sound track extending from area 29 to the other border thereof at numeral 30; the grooving 31, contiguous area 29, representing a so-called "outer overlap," which term conveniently designates that portion of a record, of the type here shown, which duplicates and synchronizes with a predetermined lattermost audible portion of an immediately preceding record when played therewith in continuity. More as to this feature later.

The annular area 32 contains the terminal groove (not specifically shown); this being presumably, according to present standards, the conventional type of eccentric grooving which oscillates a tone arm 14 or the like to normally leave the record circle and return to position 14'. But see also alternative suggestions to be later given thereon. The annular phantom marking 33 indicates, quite generally, the location of the so-called "inner-overlap" which is impressed on the opposite or B side of the record, as best shown in FIG. 12. Grooving 33, of course, represents a duplication of the sound grooving directly adjacent the end of the sound track on the A side of the record whereby the musical carry-over from one side to the other may be made continuous and co-timed—or, if so preferred, almost continuous, for reasons to be further clarified.

Thus, too, on this same B side of the record, there is a briefly grooved "run-in" 34 (not actually shown in order to avoid unrequired complication of the drawing) and a further continuation of the sound track through area 35 to the circular line 36; adjacent which line the phantom marking 37 roughly indicates the beginning of that particular area of the B side of record 27 which will be overlapped by the outermost sound grooving of the A side of the next record to be played in non-skip sequence: such as record 25. As will be better understood from the later description, such run-in grooves are largely provided to accommodate playings which do not call for non-skip reproduction.

Key-slots 21, or slot 21', are self-explanatory in view of the prior description relative to FIG. 3, and these—or said single slot 21'—are formed in the annular axial collars 38, which are depressed, in accord with the later more detailed description to be given of FIG. 1.

It is evident, then, as in FIG. 2, that whereas a stylus 16 of an upper tone-arm 14, position 14, would contact the A side of a typical record 27 (or record 24) adjacent its outer edge and move radially *inwardly*, to position 14'', stylus 16' of lower tone-arm 15, position 15, would make landing contact with the B side thereof, moving thence radially *outwardly* of the record surface to position 15'', where it, too, finally enters a terminal groove. The latter is not visually shown but is assumably another eccentric occupying the area 39 of FIG. 12. This so-called "outer eccentric" or its beneficial equivalent produces—at least for present illustrative ends—a normal oscillation of arm 15, followed by a conventional tripping action to actuate a movement of this tone-arm outwardly from the now nearby outer confines of the record circle to its own stand-by position 15' in FIG. 2.

The respective inward and outward movements of the tone-arms 14 and 15 make possible the continuous turning of the spindle 4 in only one rotational direction, as opposed to prior art structures designed to play a record on both sides without turning it over; such a prior result, for illustration, having been accomplished, by the well known RCA Victor phonograph called V–225, only by the expedient of stopping and reversing the turntable. Obviously non-skip side-to-side and record-to-record synchronization, wherein it would be necessary to make a complete intermediary stop, cannot be effected by such a technique, even though the sound gap was thereby said to have been reduced to the then record minimum of 4½ seconds.

*Other procedures*

It will now be obvious that during a transcription of the B side of record 24, the upper tone-arm 14 normally moves from position 14'' to stand-by position 14'; which movement in itself can, and preferably will, cause an automatic operation of that specific changer mechanism which controls upper shelves 5, 5 and blades 6, 6. In short, while the B side of record 24 is still being transcribed, record 25 drops a very brief distance, and almost inaudibly, to position 25' where its rests on and in exactly co-registered contact with record 24; both thereof having been so synchronized as to each other when initially recorded and both being accurately maintained as to each other co-rotatively by means of a single spline 19' and respective single key-slots 21'.

At this point it should be explained that in order to avoid unnecessary duplication in the drawings the splines 19 and key-slots 21, as intimated earlier, have been graphically shown in threesomes; this arrangement being slightly preferable—for rapidly effected driver and driven engagements—to single splines and slots according to an alternative technique in lieu of non-skip operation, with its attendant precise adjustments and, necessarily, more expensive tooling. Wherein the end amply justifies the means, however, and wherein the objective is to obtain continuous, non-stop operation from side to side and record to record, it is desirable to provide but a single spline 19' and a single complementary record slot 21' whereby to insure accurate registry and synchronization throughout from the recording stage to each reproductive stage of a given plurality of record.

One less preferred method, to be sure, could employ all three key-slots 21 and a threesome of splines 19, in non-skip sequencies, by meticulously stacking the records into engagement with the spindle before starting the machine; one of the slots of each record being differentiated in some manner in order to insure its correct co-registry with every other similarly located slot of the synchronized records in that particular group.

Returning to record 25: on its arrival at position 25', and in face to face contact with record 24, it will be supported initially from below the latter named record—indirectly, of course, by the plurality of elements 22—but, at almost the same time, preferably, will be engaged by the V-jaw threesome 23. These will now be explained in connection with FIG. 7.

*The V-jaw grips*

Since the advent of such early record-slicer and record-camming mechanisms as those described in U.S. patents entered here by the British Boumphrey, No. 1,469,152, and the British Slater, No. 2,063,199, and including the domestic issues No. 2,230,106 and No. 2,397,932 to Joseph Erwood, for specific examples, the art has become so replete with comparable devices that any meticulously detailed instructions regarding like mechanisms, addressed to the sundry skilled instrument makers and designers of modern phonographs, would be quite superfluous. The improved mechanism of FIG. 7, therefore, is largely schematic and can be readily provided in any required equivalent form by sundry workers of the art; that is, after the benefit to be derived herefrom.

In brief, the lowermost record is, in this more specifically shown version, just being engaged at its inner annular edge by a lower V-jaw grip 22; an equidistantly spaced threesome of these being preferred and this form of support being preferable in this location to the conventional right and left duality of upper shelves 5 and 5. The reason for this preferance is that whereas the shelves 5, 5 have a simple supporting and releasing function, in conjunction with cooperating blades 6, 6, it is desirable for the members 22, or their equivalents, to overcome any tendency for the record 24 to lift, to rock or to bind against spindle-post 4 when contacted by stylus 16 or stylus 16' of FIG. 2, as the case may be.

Therefore each jaw member 22 has the more outwardly protruding under jaw 40 and a receded upper jaw 41. Jaw 40, of course, is the first to receive and support the inner axial edge of record 24; but quickly thereafter, and preferably before engagement of the record by stylus 16, the whole member 22 is extended somewhat farther outwardly, until upper jaw 41 enters the record path and both jaws fully engage the record against the influence of needle pressures tending to push it out of a horizontal plane during transcription.

Dotted line 42 indicates that there may be an ample set-back of jaw 41 well inwardly of the record path proper, during the initial contact of the record with lower jaw 40. Thereafter a very slight further outward movement of both jaws is sufficient to securely lock and hold the record as aforesaid. The lower jaw may be very slightly curved as shown, or otherwise suitably configured, to facilitate a proper unified contact.

When, having returned to stand-by position 14', the tone-arm 14 of FIG. 2 is again outside the record path and the upper record-changing action has occurred with respect to record 25, FIGS. 2 and 7, the somewhat differently configured V-jaw member 23, operating independently of jaw member 22 and in practice preferably positioned as a threesome at entirely different locations on spindle-post 4, now comes into play.

Member 23 need have but two lateral movements, namely, outwardly to grip and hold the record 25, as at phantom 23', and inwardly to clear the record path approximately as shown. Both jaws of member 23 may be of the same general configuration, as indicated, inasmuch as record 25 will probably be supported by record 24 for a substantial interval before the former's engagement by stylus 16, in precisely the same manner that record 24 was engaged in the first instance by this stylus.

And, since the members 22 and 23 are preferably spaced from one another, on respective planes, around the axial edges of the records, when engaged thereby, it is unnecessary that their respective jaws shall be confined within the horizontal upper and lower surface planes of a single record; that is, so long as the upper jaws 41 of each member 22 is, at all times, below the narrowed axial central area—called collar—of the superimposed record 25, for example, and the lower jaw of each member 23 is clear of said central area of record 24. In scale, therefore, the respective jaws could be substantially larger than shown, since members 22 and 23 are not, by preference, aligned vertically.

Clearly, before the stylus 16' of FIG. 2 has completed its traverse of the lower sound track of record 24—and its initial, precisely timed engagement having occurred at the beginning of the inner overlap on this side of the record—the stylus 16 will be returned to a poised position directly above record 25, ready to land thereon and begin playing the outer overlap of this record on its A side, just before completion of the lower sound track of record 24.

With the threesome of upper jaw members 23, then, in secure locking engagements with record 25, the stylus 16 is automatically landed at the predetermined point to begin playing the next outer overlap in sequence; this, of course, taking place just before stylus 16' has completed its traverse and while record 25 is still carried in contact with record 24. But it is apparent that, if the remainder of the currently unplayed records are to be similarly transcribed, and record 25 played on both its A and B sides, record 24 must be released from members 22, the latter momentarily retracted entirely from the record path, and said record 25 lowered only the width of a record to the position just lately vacated by record 24. Such a transposition takes place without in any way disturbing the even movement of stylus 16—as also provided for in FIG. 7.

*Record lowering means*

In short, aside from its co-rotation with a spindle 4, each member 23 is presumed to be rotatable in the known manner, approximately, of the blades 6 of FIGS. 1 and 2, whereby in one relation the jaw portion moves rotatively outward into the full arcuate contact position indicated by phantom 23'. It is also rotatable inwardly to clear the record path, as by means of post 43 from which it is carried. According to this version, the rotatable post 43, together with member 23, may be very slightly raised and lowered at predetermined intervals by means of the assembly which includes an annular collar 44; and against the underside of which collar or cam-pad rides a duality of small wheels 45, interconnected on one side of the post 43 by a yoke 46. The wheels 45 could of course be replaced by suitable non-rollable elements, since the rotations of post 43 and collar 44 are quite brief and only intermittent. They could, for example, be replaced by suitably mounted ball-bearings—other options being obvious.

Yoke 46 is connected to the lever 47, which is operable from the fixed pivot 48 and adapted to be actuated through the cam-pad 49 by means of cam 50. Obviously, as cam 50 is normally turned by the eccentric camshaft 51, it imparts a predetermined slight raising or lowering movement of cam-pad 49; and this movement also causes the wheels 45 to move either upward or downward, as generally indicated, whereby in one relation the post 43 is in the approximate position shown by member 23 at phantom 23', said member 23 having been rotated into engagement with the record 25. In another relation, the member 23 is retracted inwardly from the record path or inner circle as already explained. Means for rotating post 43 are not shown, since they may, for instance, be similar to the known arrangement including intermediary gear-wheels now employed in changers having separator blades 6 or the like. Those skilled in such matters can readily provide for synchronous operation of a threesome of members 23, instead of the standard arrangement of only right and left blades 6 of said RP–168 type of changer.

In view of the foregoing, it will be clear that record 25 can and will be lowered at the proper time from the position of phantom 25' to the position vacated by record 24, following its release from members 22 and their own momentary retraction to clear the inner record circle. These members 22 are quickly re-extended, however, to engage record 25, enabling the members 23 to thence first retract inside line 42 and return to their former positions in readiness to receive the next descending record. This, in general terms, completes the cycle which began with the contact of stylus 16 on the upper side of record 24; and such a cycle will be automatically extended to the other records which are still supported on shelves 5, 5.

It is to be noted, too, that regardless of whether the records are of the new 7-inch light-weight type or are relatively larger and heavier, they will drop with scarcely any audible sound instead of with the undesirable clatter so characteristic of records displaced by prior automatic record-changers. Such a clatter is caused by one record striking against another as it drops—often from a location several inches above the last previously played record. In the present improved structure, however, each played record has but an exceedingly brief distance to drop; and, instead of falling solely by direct gravity pull, its course is interrupted by a cushion of slightly compressed air, which is fromed just under the record as its peripheral edge largely closes the upper side of container 11'.

In this connection, I by no means deem it essential to smoothly lower record 25 unless, if sound tracks become more microscopically smaller and needle pressures even lighter, greater delicacy of all transcriptive contacts would be desirable. For while a stylus, in dropping up to ¾ of an inch to contact a lowermost record in the turntable position of FIG. 1, ordinarily, is subject to a definite "jump" before entering the sound track proper, record 25 need move—or be dropped—but the thickness of a very thin record. Thus it could be released during transcription by members 23 to the partially, and thence fully, re-extended members 22. The raising and lowering mechanism is, therefore, of its greatest service in not merely changing the record planes but in insuring accurate record engagements and disengagements against the possibility of these functions being hindered by needle pressure.

It will be understood that the apparatus in FIG. 7 is largely schematic and directed to professionals of the art who, needless to say, will require no other detailed data in constructing the actual preferred mechanisms. In brief, such questions as to how to by-pass one member by another, whereby to best utilize the available space within post 4, and without conflicts between the upper and lower changer members, are quite elementary to such individuals.

Moreover, I have no objection to substituting one form of changer device for another, where circumstances so dictate and as well exemplified by the alternative arrangement of FIG. 8. It is unnecessary to more than indicate briefly that the upper and lower parallel blades 6′ and 6″ are mechanical equivalents, approximately, of the upper and lower jaws of member 23. These twin blades are, of course, carried rotatively from post 43′, whereby, in one position, to securely hold the record 25 horizontal during its transcription, including the aforesaid lowering action, and in another relation whereby to release it downward to container 11′.

As intimated previously, it may not, at first, be found commercially preferable to produce records for home entertainment that have to be so carefully recorded in synchronization, and machines designed with the precise adjustments necessary for non-skip reproduction. Since costs, competition, and profit factors are likely to decide such an issue, it may be deemed sufficient to limit initial production to less expensive records and machines which merely play the records from side to side and record to record with a scarcely noticeable sound gap, amounting to the briefest fraction of a second. In anticipation of such a possibility, the more versatile type of record is provided therefor having exceedingly brief run-in grooves as aforesaid; and the "outer" and "inner" overlaps could, too, be omitted.

Or each returning stylus, when poised very close to the record surface, can be precisely landed thereon at the very beginning of each upper and lower sound track and the run-in grooves reserved for "manual" playings, or for playings on other phonographs having auxiliaries for either manually or automatically reproducing this type of record in ordinary, one-sided sequence.

*Full non-skip reproduction*

Still, the means for bona fide non-skip reproduction are herein amply provided; it being only necessary to clarify certain as yet unexplained factors which will naturally arise. In order to simplify the earlier description, and to avoid possible premature inferences being drawn, reference was freely made to run-in grooves and to actuations of the tone-arms solely by means of more or less standard eccentric terminal grooving. And these features are, as explained, necessary if such records are to be sold for interchangeable use on many instruments other than those disclosed.

Assuming, however, that the non-skip type of Multiphone records of a given group have been accurately recorded and synchronized, in an obvious manner, it follows, first, that such synchronization must be preserved from the beginning to the end of the reproductive sequence. Such a continuity of reproduction is, in part, assured by the single spline 19′ and key-slots 21′, FIGS. 2, 3, 11 and 12, since said spline will invariably engage and maintain each properly stacked record in its previously recorded relationship to each other record of the group. But it would, indeed, be scarcely advisable to rely upon a method which included landings in the so-called run-in grooving, so timed as to cause the contacting styluses to play overlapped record areas in exact registry.

On the other hand, it is a simple matter to have the respective upper and lower tone-arms enter the record circle and remain poised, ready to drop or to rise instantaneously to the sound grooving—as actuated—within the split part of a second. Ordinarily, it could be argued that the "split part of a second" might not be nearly sufficient for exact synchronization. Nevertheless, wherein all factors are predetermined with great exactitude, and wherein, after innumerable experiments, perhaps, the intervals required for such close-up stylus engagements are precisely known, it becomes evident that the same continuity that was cut into the original masters at the time of the original recordings can be preserved throughout the later reproductions. That is: provided that, in addition to the keying action of spline 19′ and each of the slots 21′, means is provided to always actuate each tone-arm stylus for making contact at the critical instant.

The superficial conclusion—predicated on standard, prior types of records, having each a sound track of slightly different length from every other of the same record size—is that such a result is not mechanically possible or practicable of attainment. However, in these non-skip record sequences, I capitalize the fact that *every record of the sequence except, perhaps, the B side of the last thereof to be played, can have a sound track of the exact same length as every other one of them, and on both A and B sides.*

This means, too, that tone-arms 14 and 15 can be adjusted to always make their stylus contacts, respectively, at the exact same points on every record, due allowance being made for the A or the B record side to be contacted. There remains, then, but one other component necessary for effecting substantially full transcriptive coordination.

For this purpose I prefer to employ a relatively simple, mechanical-electrical assembly of elements, as seen in FIG. 19, comprising the spindle-post 4 together with the appending shaft member bearing worm 52; said worm being engaged by the worm wheel 53, and in train with which are reduction gear wheels 54, 55 and/or any required other number and arrangement thereof for driving drum 56 at a speed predetermined according to the exact time intervals required for each and all record sides, corresponding to the orbital movements of the contact cams 57. Or a single contact cam 57 could perform each actuation at each full orbital movement.

Thus, referring also to FIGS. 2, 11 and 12, it having been precisely determined that the elapsed time between each actuation of the respective tone arms 14 and 15, to make accurate landing contacts with the different upper and lower areas 31 and 33, is X minutes and X′ seconds to a fraction thereof, drum 56 will be geared to bring one of said contact cams—such as cam 57′—into engagement with the cam-pad 58 of switch 59 at each critical instant.

The electrical circuit represented by wires 61 and 62 is, therefore, closed at every interval of X minutes and X′ seconds long enough to cause the suitably wired up tone arms to make their requisite needle contacts. Schematic contact 60 is self-explanatory.

As the number of r.p.m.'s of the records is known, in relation to the precise transcriptive contact points, and the exceedingly brief time required for each stylus to travel from its poised position to the predetermined record groove has also been carefully calculated, it is merely necessary to actuate arm 14 at point 63 above the record 27, whereby to cause stylus 16 to engage the sound grooving a brief instant later at point 64. In like manner, X minutes and X′ seconds thereafter, the arm 15 would be actuated, when poised just below point 65 on the B side, whereby to cause stylus 16′ to pick up music at point 66 (this side of the record being viewed as though in its normally inverted position).

Theoretically, of course, if every adjustment could be made for perfect synchronization between the tone-arm pick-ups, one of these could contact the sound groove at exactly the same critical instant that the one previously playing the opposite side of the record broke its contact. The overlapping grooving, however—which may be of any desirable length—is provided for such momentary duplication of the musical transcript as may be expertly determined; and even if a slight lower fidelity of tone should occasionally occur it would be of exceedingly brief, instantaneous duration.

It is within the province of skilled technicians, including those conversant with finely adjusted clockworks or the like, to provide every required delicacy of adjustment between the above mentioned intercooperative members. And sundry substitutions and alterations may readily be made within the scope of the broad means disclosed. Thus the tone-arm actuations might be initiated mechanically only and in sundry ways, electronically, or photoelectrically, to mention certain possible variants; and instead of the contactors 57, in this particular version, high and low cams (or just one high-low cam) could be employed in a like circumferential arrangement around drum 56, in conjunction with a double-throw switch. All such devices are well known and need not be graphically shown. Reference, however, may be made to the dual tone-arm arrangement of A. R. Downs in Patent No. 2,068,449 of Jan. 19, 1937, as but one operable device of this general description; in view of which, when considered both practically mechanically and practically schematically in relation to the aforesaid machines and records, and to the cycle-setting mechanism of FIG. 19, any of sundry skilled designers may readily supply the commonly known minor parts needed to construct records and record-players of the described pause-free kind.

*Other fields of application*

Needless to say, instruments and records of the type just described need not be limited to home entertainment, and it is believed that large markets therefor exist in the respective fields of radio-broadcasting and motion-pictures. With certain inherent deficiencies in sound-on-film resulting in its displacement, to a considerable degree, by disc records co-timed with the projection equipment, the advantage of being able to employ a fully automatic series of light, long-playing multifunctional records, of any predetermined handy size, instead of the existing large transcription discs will be most apparent.

Such records, according to improved recording techniques and the aforesaid RP–168 types of changer therefor, should result in greater sound fidelity and more foolproof operation. Thus, instead of having to manually "cut in" a new transcription record at certain relatively frequent intervals, a group of ten 5-minute non-skip records—five minutes to the side, that is—could play continuously for an hour and 40 minutes. Specially designed motion picture machines and records could be provided to operate for the duration of entire movie programs.

It should be noted, parenthetically, that inasmuch as the aforesaid records are locked in transcriptive rotation by splines 19 or the like, but possibly including records which are merely keyed by radial grooves and ridges or the equivalent elements 72, 73—to be further related—relatively wide label areas are entirely unncessary to insure adequate tractive contacts therebetween. For this reason it would readily be possible to make the label areas smaller and to thereby at least double the length of the sound-grooving within the peripheral confines of 7-inch records, for example. Ten small records so adapted for motion picture entertainment would, therefore, operate continuously for three hours and twenty minutes.

Detailed tone arm mechanisms are not shown in view of earlier reference to said RCA Victor Service Data leaflet No. 5, for 1949; nor, in view of the reference to said V–225 phonograph for playing both A and B sides of a record without turning it over, it is deemed necessary to show a particular modification whereby to contact the lower sides of each record 27 or the like. In this same general category, however, is the tone arm featured in Patent No. 2,318,654 to B. F. Wissner—which see, as well as later reference to Andrews, No. 2,281,548. Or see either Fisher, No. 2,550,794, issued May 1, 1951, or Filalatures et al. (French) No. 822,026. A more recent disclosure featuring a single tone arm having upper and lower pickups is contained in Patent No. 2,643,127 to Gregg et al.

While the previous description relative to FIG. 2 disclosed a preferred technique for playing records in either non-skip or nearly non-skip continuity, it is evident that, in simple upper and lower playings of records, the orderly movements of the arms 14 and 15 may be reversed; arm 15 and stylus 16' making each initial contact with a newly dropped record 24 and the like, followed by arm 14 and stylus 16 on the upper sides of the records. Furthermore, if elected, by replacing the lower container 11' with lid 10' of container 10, FIG. 1, it becomes possible to play each under side of the records in the position of record 24 and the upper side thereof by another tone-arm—the equivalent of arm 14—after the record had dropped to the turntable position.

A comparable technique is suggested in said patent to Wissner, but employing an entirely different phonographic structure. See also the later detail herein regarding FIG. 26.

Important other techniques are shown in FIGS. 5, 6 to 10, and FIG. 24, including said FIG. 26, as well as in FIG. 1; but before describing these and the detailed operation of the container auxiliaries, attention is again directed to certain as yet unexplained but advantageous features of said multifunctional type of record.

*Special record features*

In the FIG. 1 view, container 10 and the records still partially encased thereby are broken open to illustrate several optional features. For instance, it is very desirable to prevent the actual sound tracks of the records from contacting one another, as they do on all record discs known to me prior to my much earlier concept which is only now disclosed. This I accomplish by providing comparatively thicker label areas 67 and substantially thinner annular areas 68, radially outward therefrom, bearing the upper and lower sound grooving along with any desirable run-grooves and terminal grooves as elected.

These areas 68 may extend to the peripheral edge of the records, as indicated by phantom lines 69 adjacent the outer edge of the upper record 70. Alternatively, wherein it is desired to conform to the prevalent standard, so that the more versatile type of record can be played on various existing record-changers, such discs may have the brief annular areas 28 as mentioned earlier in reference to FIG. 11. Such records, of course, might then be employed on instruments having mechanisms wherewith each lowermost record is either sliced and dropped to the turntable by laterally disposed blade devices, carried outside the record circle, or by any of the sundry record-cammers which laterally push the lowermost records from off-set turntable spindles.

In either case the grooved areas 68 will be entirely out of contact with each other, at all times, and much less record material is required in their construction. The latter option has the added advantage of preventing the infiltration of dust particles to the grooved surfaces of an unprotected stack; thus also excluding atmospheric dust from the sound tracks of stacked records of a playing assembly except during their brief exposed operation in the position of records 24, 25 and 26 of FIG. 2. Such records may, moreover, be placed within the containers under definite pressure to prevent warpage, and without injury to delicate sound groovings during extremes of temperature.

Needless to say, however, the warpage evil would have no effect as regards records bearing key-slots 21', when played in engagement with splines 19' or the like.

Inwardly of the label areas 67, the records are again preferably of the same thinness as the areas 68; and all such features result in better stabilized, more warp-resistant record structures.

*Variant record types*

Mention has been made of modified, other types of records, and one of these will be described duly in connection with the instruments of FIG. 6 and FIG. 24, wherein the central aperture of a record can be according to prevalent smaller turntable spindle diameters. In order to adapt the relatively light weight record for prior standard machines, however, having no spline members for engaging and/or driving them in transcriptive rotation, and to prevent slippage due to relatively heavy tone arm pressures or other causes, are provided means whereby every record of a stack may be positively keyed to every other record thereof as well as to the turntable or its equivalent.

That is, in FIG. 1, for a brief example, the upper record 70, at upper and lower areas 67, has one or a predetermined plurality of radially disposed grooves, as generally indicated by phantom lines 71, adapted to receive one (or more than one) radially disposed, complementary raised portions of records resting either thereon or therebelow.

However, by option, in lieu of these radial ridges and recesses the records may each have one or an annular series of small cup-shape holes 72 (see FIG. 3) with alternating, complementary short knobs 73—or just one thereof—having a like interlocking function. In either case a whole stack of such records may be keyed against slippage to a similarly configured turntable member; as exemplified by the intentionally enlarged configuration 74 on the underside of lid 10', which is adapted to quickly receive and positively key the first record of a stack thereto during normal rotation of the table.

It is now apparent that records so impressed may not only be constructed of very light weight material, for playings with tone-arm pick-ups having relatively heavy needle pressure, as desired or required, but may be employed on instruments designed merely to play records with minimum sound-gaps short of actual non-skip reproduction. That is without having to utilize splined spindles or axial key-slots therefor.

Such records, however, when dropped to the turntable position, would not tend to instantaneously key to one another; and to facilitate immediate interlocking—and engagement of the lowermost thereof to the turntable—I provide the subsidiary device at the right in FIG. 3. In brief, said device comprises an arm 75, including the cam-member 75' and clutch-pad 77, which operates on the pivot 76; so that as each successive record drops to the turntable position it will be lightly contacted and braked by the pad 77. Either the normally rotating turntable itself or a previously keyed uppermost record carried thereon will make instant interlocking engagement with such a record; said pad being thence cammed out of the way by the movement of tone arm 78 as it enters the record circle, substantially as indicated.

*Other phonographic types*

The modified machine of FIG. 5 is, in large measure, self-explanatory when considered in relation to the previous description. According to this structure the records 27 are not supported from oversize spindle 4', as in FIG. 2, but are initially received on and subsequently transposed from the laterally positioned blades 79 in association with the combination slicing-and-supporting members 80; as see Carson, Patent No. 2,280,685, for all required details thereon. Or see said patents to Erwood, wherein similar other record-changing devices of the prior art are disclosed.

Substantially like upper and lower blades 80' and 79', right and left, are provided in lieu of elements 22 and 23 of FIG. 2; and while the dogs 81 of FIG. 6—to be yet described—may be employed as hold-down means, the machine $3^a$ is, in this version, provided with the midget wheels 82, which are desirably castered and adapted to be swung inwardly automatically from the respective posts 83, in synchronization with the slicer blade assembly.

Said wheels have tires of a rubbery or other yieldable material; and, during exhaustive tests by this applicant, it was demonstrated that wheels having relatively soft rubber treads caused no noticeable wear whatever on record surfaces, which were contacted for exceedingly long durations. Such wheels may be mounted to exact a slight extra pressure on each record contacted unless, of course, tone-arm pressures from therebelow are so light as to obviate the need therefor.

The right and left supporting wheels 84—also preferably castered—are adapted for similar inward and outward movements from posts 83 as predetermined. And while both the upper and the lower sets of these wheels can be in threesomes, necessitating a third supporting post therefor, it is deemed sufficient to provide only the duality of posts here shown with wheels 84 in slightly spaced twosomes; that is, two of each carried from a single rotatable arm (not shown), and one such arm to each post. The actions of the upper tone-arm 14 and lower arm 15, relative to records 24' and 25', will be sufficiently obvious in view of the data given concerning the like components of FIG. 2. But in this connection it should be mentioned that the said "substantially like" blades 80' and 79' would be so further configured that, in the actual playing position of records 24' and 25', such a record (or records) is supported solely by wheels 84. This is attained by merely providing a suitable gap in the arc of the blades; the latter also enabling a container 11' to be seated in a position to receive the played records, which are loaded from another container as generally shown thereabove.

In the combination of FIG. 6, a type of record-player is shown which, in common with the instrument of FIG. 24 to be yet described, has one distinct advantage over the structures of FIGS. 1, 2 and 3; namely, that substantially all of the operations heretofore described may be carried out therewith while utilizing a record that need not have an axial opening any larger than those of the current prevalent type; in short, whereby to accommodate spindles of relatively much smaller standard diameter. Thus, as desired, such records may readily be played on sundry other phonographs, along with existing records of the erstwhile exclusive standard sizes and configurations. If such versatility is to be incorporated therein, these records may be produced in ordinary 10-inch and/or 12-inch diameters; but for the sake of greater compactness and other desirable characteristics, they might be of the same preferred diameters as the records 20 or 27 heretofore referred to.

Salient features of the abbreviated machine $3^b$ include an elongate, slender spindle 85, bearing the spline 86; over the free end of which spindle disc records are received and later successively transposed to the playing positions of records 87 and 88; and thence, as post played records, deposited within a container 11' for example. Means for initially releasably supporting a record stack on machine $3^b$ are not shown, since they may be according to suggestions given relative to FIG. 5 but, preferably, without inclusion of the secondary blades 79' and 80' or their direct mechanical equivalents. (See also FIG. 24, to be described duly.)

Instead, in this particular embodiment, the conveniently indicated record-supports are wheels 84' and 84'', which may be substantially the same as schematic wheels 82, 84 of FIG. 5. These small wheels are provided according to suggestions given in respect to FIG. 5, in upper and lower dualities, and are also desirably fully castered and not merely swiveled. See, however, the later description relative to alternative means, according to which neither wheels 84' nor 84'' are required. Further reference to the fragmental container forms in both FIG. 5 and FIG. 6 including other views, will be made hereafter. Obviously, container 11'' would be removed from the record stack if the latter is to cooperate with changer blades such as shown in FIG. 5.

*A similar technique*

Two tone-arms are provided to play records 87, 88 and the like on first one side and then the other, either in non-skip sequence or with an exceedingly brief sound gap from side to side and record to record. However, a plurality of options is presented. The method in general is little different from that which was explained with referenec to records 24 and 25 of FIG. 2. In brief, then, the arm $14^a$ having stylus $16^a$ can, after transposal of record 87 to the upper playing position, move into the record circle and start playing this record while arm $15^a$ having stylus $16^b$ continues poised in the pre-landing position shown; thereafter contacting and following the record downwardly. Or it could wait at the stylus position $16^d$ for arrival of the record directly thereabove, as will be clarified shortly.

If a non-skip sequence is being transcribed, the procedure will be according to the so-called inner and outer overlaps when, arm $14^a$ having neared the end of its traverse, the stylus $16^b$ of arm $15^a$ makes its own contact with th under side of record 87 at either the upper or lower positions, as predetermined. Thus the tone-arm $15^a$—according to one option—while mounted for the usual lateral swingable movements and conventional landing contacts, is adapted to describe a slightly different operative pattern from that of arm 15 in FIG. 2. Specifically, after arm $15^a$ begins to play the B or lower side of record 87 and arm $14^a$, resirably, has already moved to its stand-by position (see FIG. 2), the plurality of supporting wheels 84′ will, by suitable actuation, move slowly downward the required short distance to the position of lower wheels 84″ which latter may at this time be clear of the record circle.

At this point, wheels 84″ can move to supporting positions to release wheels 84′, in order that the latter may clear the record circle and return to their upper locations, ready to receive the next record in sequence.

Before completion of the B side of record 87, in the position occupied by the preceding record 88 (which would, normally, have already dropped to the container 11′) the next lowermost record 89 of an upper group thereof will be released to the position just previously occupied by record 87. At this stage, two records are in respectively spaced playing positions concentric to the spindle 85. Thereafter the arm $14^a$ returns to its poised position over the transposed record 89; and, just before completion of the traverse of arm $15^a$ in its lowered position, arm $14^a$ and stylus $16^a$ make contact with the outer overlap of record 89.

This enables arm $15^a$, shortly thereafter, to swing outwardly a very brief distance and return to its poised position thereabove, ready to make another contact with the B side of record 89—and so on in record to record continuity.

It is obvious, however, that such a technique may be modified to have stylus $16^a$ make its initial contact with the record 88 (for this illustration) at position $16^c$; and before completing its traverse on this lower plate, stylus $16^b$ could make contact with the B side from its poised position $16^d$. Thereupon, record 87 having arrived at the upper playing position as shown, arm $14^a$ would swing outward and thence upward and take up a poised position ready, upon further actuation, to land and start playing the A side of this record. It could, to be sure, begin the sequence from such a position.

The lowering operation, according to this version, would be repeated with tone arm $14^a$ riding the upper record downward to the lower playing position, while the arm $15^a$, on duly completing its own traverse, merely swings briefly to its stand-by position until again actuated to return in readiness to play the B side of the next lowered record. The required complementary movements of wheels 84′ and 84″ is obvious.

The phantom 90 shows a single tone arm of the type featured by said patent to Wissner, No. 2,318,654, having an upper needle 91 and lower needle 92, which could be employed to contact both upper and lower sides of successive records; but not, to be sure, in non-skip sequence. The Wissner technique, utilizing standard 10-inch or 12-inch records, would be modified and improved, however, according to the herein taught method and mechanism, which make possible a much briefer sound gap from side to side and record to record when utilizing a single tone arm.

During the lowering and playing of records 87 and 88 the wheels 84′ and 84″ cooperate with arm $14^a$ as respective supporting and hold-down means; but, except during the brief transitions from upper to lower playing positions, it is desirable to additionally stabilize the records horizontally; as by means of the automatic latch members or dogs 81 and 81′. Each set of these is preferably provided as a threesome. Such latches operate much as do ordinary umbrella clips and may, indeed, be merely weakly, similarly spring mounted. Preferably, however, they would comprise a plurality of the members $81^a$ and $81^b$ of FIG. 9; and, while a threesome is desirable, only the twosome of the drawing is shown for greater clarity.

Where a threesome is employed, it is customary, in similar assemblies, to replace pins 93 with a small annular wire, spring tempered, which is forced through suitably configured eyes therefor and released to automatically snap together upon itself—or nearly so; an annular groove 94 being provided in spindle 85 to facilitate assembly within the inner confines of the record path. Bearing 95 and spring 96 are self-explanatory; said spring being only strong enough to maintain the members $81^a$ and $81^b$ outwardly against the upper inner side walls of the records, as hold-down means, during most of the musical transcription but sufficiently weak to permit each record to pass readily thereover in descending, and, as post-played records, to be readily stripped back over the receded latches. For obvious reasons, therefore, the preferred technique is that whereby stylus $16^a$ can at all times supplement the hold-down action of elements $81^a$, $81^b$ during transcriptions, and independently thereof during said brief transitions of the records.

FIG. 10 shows another option comprising a desirable plurality of dogs $81^c$, $81^d$, adapted to be actuated at exact intervals by the upward and downward movements of the cam device 97; it being obviously possible to connect up such a mechanism, via shaft 98, with suitable means for its intermittent actuation below the motorboard of machine $3^b$. Such devices are also presumably in threesomes.

Inverted elements $81^c$ and $81^d$ of FIG. 6 indicate, hypothetically, one means of additionally supporting the records 87 and 88; that is, in cooperation with upper dogs 81 and 81′. The detailed construction and action of inverted dogs $81^c$ and $81^d$ can readily be understood by merely turning FIG. 10 upside down. The use of a spaced triality of dogs $81^d$, FIG. 6, suitably synchronized with the remainder of the record-changer mechanism as indicated in said inverted position of FIG. 10, would make possible the elimination of wheels 84″—only wheels 84′ being retained, in such an arrangement, for lowering the records.

Obviously, in simple two-sided playings, elements 81′ and $81^d$, for example, would suffice without utilizing either wheels 84′ or 84″.

According to the latter option, elements $81^c$, $81^d$, in their said inverted positions, would function to receive and releasably support each successive record transposed thereto, but the hold-down members 81′ would not include bearing 95 and spring 96. Instead, a compact and thoroughly workable arrangement may include a threesome of latches 81′, which could also be carried from the inner member including cam 97 and an inverted shaft 98, and just above the inverted dogs or the like $81^c$, $81^d$. The latter would be mounted as a threesome in offset relations to the latches 81′; and for the avoidance of springs in such an assembly, each of the respective upper and lower record-engaging members may be solely cam-actuated for both inward and outward movement; and they could, for this purpose, be provided with so-called sub-cams according to the spindle structure to be described directly in relation to FIG. 24.

See, for example, the later detail thereon—more specifically in respect to the sub-cams 160' and 180; from which devices the requisite arrangement for said simple 2-sided transcriptions, without turning the records over, may be readily derived.

*A further simplification*

Should it be deemed advisable to further simplify the machine $3^b$, whereby to eliminate both sets of wheels 84' and 84'', and including the suggested means to support the upper record stack, this too can be done according to said FIG. 24.

In the latter view, it will be immediately noted that all the records are directly supported solely from the spindle 85'; said spindle, as here shown, being of the prevalently smaller standard diameter but substantially enlarged for greater clarity. (It could, by option, be of any predetermined larger size.) On further scrutiny, moreover, it will be seen that each and all the major spindle functions heretofore mentioned relative to the playing of records in non-skip sequence are readily made possible within the dimensional limitations of this single, comparatively small spindle member.

And if said member seems, at a glance, to be overloaded with complicated small devices, suggesting a mechanized totem pole, the constituent components thereof are not more complex than those commonly found in sewing, knitting, and calculating machines, for example. All the parts shown can readily be supplied, in their most preferred form, by various skilled instrument makers, including such milling machine work as required to provide the several slotted apertures of the drawing.

The fully coordinated spindle sub-structures can best be understood by describing the respective sets thereof, beginning with the upper changer mechanism which includes a spaced plurality of shelf-dogs 159 and fingers 160. While conveniently shown as twosomes, members 159 and 160 are presumed, as a matter of preference, to be in respective threesomes; and instead of the different pivot pins graphically shown, the more preferred mode of assembly is according to the proposed arrangement of FIG. 9, including the aforesaid annular wire ring in groove 94 of that view.

Within the interior of spindle 85' is the elongate, so-called primary cam-rod 161, on which several cam elements are carried integrally; certain of these being operable up and down inside the spindle and others by the rotation of rod 161. The uppermost assembly, however, is independently operable on the inner, so-called secondary cam-rod 161'.

Both dogs 159 and fingers 160, which are normally, by preference, of very thin construction as hypothetically viewed from right and left sides in the drawing, are here operated solely by the raising and lowering of said secondary rod. And it is obvious that the same slight downward movement of this rod, which caused dogs 159 to protrude from within the spindle, to their supporting positions below record 162, also withdrew coincidentally the fingers 160 from the inner record path—as generally indicated by respective small phantoms.

Incidentally, should it be deemed advisable and operable in some assemblies to make inner rod 161' integral with rod 161, or to utilize any other operable component of FIG. 24 to the exclusion of another or others thereof, such an election will hereafter lie within the province of skilled technicians of the related art.

The cam 163 is pressed against the widest inner upper area of the dogs, and these are automatically forced laterally outwardly to the positions shown. But an upward movement of cam 163 to position 163' would also raise the cam 164 to position 164', thus forcing the dogs back inside the spindle as indicated by upward pressure against the feet 165. Simultaneously, the fingers 160 would begin to be moved outward into engagement with the underside of record 166 in time to support it and the remainder of the stack just before record 162 is released.

Such a movement is accompanied by the upward extension of the uppermost cam 167, against which sub-cams 160' are engaged, to position 167'; thereby permitting the sub-cams to move inwardly as required. Any need of auxiliary springs is eliminated by the co-action of the cams.

FIG. 25 briefly shows the general appearance and thin construction of the dogs 159, when individually viewed in frontal elevation.

*Three phases of movement*

In the three-phase, overall assembly seen in FIG. 24, the respective cam devices associated with records 168 and 169 are integral with said primary cam-rod 161; but, being capable of both rotational and limited vertical movements, this rod exerts one phase of movement relative to the lower jaw-locks 170 and a different phase with respect to upper jaw-locks 171. In brief, when record 168 was dropped from its former position, now occupied by record 162, it was received by jaw-locks 171 during a graduated rotative movement of the lower wing-cam 172, complemented by the cooperative action of upper wing-cam 173. That is, the upper outward areas 174 of the jaw-locks are entirely within the cylindrical outer configuration of spindle 85' in the first stage of such a movement and the more protruded lower jaw portions 175 project just enough to initially receive and support the record. But on completion of said graduated movement the jaw-locks are in their fully extended positions, causing record 168 to be moved very slightly upwardly again until firmly gripped within the triangle of the respective upper and lower jaws approximately as shown.

Such a graduated actuation of the jaw-locks is made possible by providing right and left tapered shoulders on each wing of the wing-cam 172. Consequently, only the outermost side walls of the wings of this cam will be in contact with locks 171 when these are fully extended, as at contact points 176. Obviously the sub-cams 177, at such times, recede into the spaces between each of the wings of wing-cam 173, since its own wings extend radially outward at respective locations on vertical planes approximately 45 degrees intermediary of the vertical planes of the wings of cam 172. Obviously, also, this enables the wings of wing-cam 173—and which same may also have tapered shoulders—to exert a correspondingly graduated, inner retractive movement on jaw-locks 171 coincidental to their gradual release by the wings of cam 172 to clear the record path.

*The lower jaw-locks*

The action of the reversed type of jaw-locks 170 is largely self-explanatory in view of the explanation given relative to locks 171.

In their case, however, inward and outward movement —in substantially the same multistage manner—is differently accomplished, and independently of the functional positioning of locks 171 at particular times. Locks 170, in short, are moved inwardly or outwardly by the upward and downward movements of cam-rod 161; and in order that such movements shall not disengage jaw-locks 171, while differently set with respect to record 168, the wing-cams 172, 173 are of adequate lengths to amply take up such movements.

When cam 178 is positioned substantially as shown, the locks 170 are pushed outwardly to their maximum distance; but when rod 161 is actuated to move cam 178 upward to the phantom position of the drawing, the lower cam 179, at phantom 179', makes contact with the sub-cams 180 to automatically cause said locks 170 to recede radially inwardly out of the record path. In order to provide a desirable multistage retractive movement of these comparable to the graduated action of wing-cams 172, 173, the lower section of cam 178 bears the respective shoulders 181 and 182; the latter only as required.

Thus, responsive to the induced actuation of sub-cams 180, these lower jaw-locks are forced inwardly from the contact positions 183 to like contacts with first the shoulder 181 and then shoulder 182; thereby enabling these jaw-lock record supports, also, to receive and thereafter release record 169 in about the same manner as was related relative to record 168. In short: whereby the record collar 38 first engages only the partly extended lower jaw members (when these operations are reversed) and is subsequently raised very slightly into full engagement therewith. At other times the locks 170 are held fully retracted from the record path, as indicated by the respective phantoms relating thereto.

During the raising and lowering of rod 161 the pinion 184—which, in conjunction with driver gear 185, controls its rotative movement relative to the wing cams—is of sufficient axial length to move readily to position 184' without becoming disengaged from the driver. Eccentric cam 186, in coaction with pad 187, represents any preferred raising and lowering means, as does the comparable cam 188 and pad 189 with respect to the inner rod 161'.

An obvious characteristic of the FIG. 24 assembly is the fact that three entirely separate, exceedingly inexpensive record-changing assemblies are made intercooperative in the one compact spindle arrangement, by contrast with the comparable components on prior automatic phonographs. Thus while certain large, heavy, and extremely complicated mechanisms of the prior art—as see Ralph Erbe, No. 2,012,185, and E. F. Andrews, Nos. 2,281,547 and 2,281,548—will play a record on both sides, the light, compact, bantam size device of FIG. 24, in synchronization with relatively inexpensive, well known apparatus for its coordination with the required tone arm movements, will play an entire series of disc records in non-skip continuity. The aforesaid heavy, complicated mechanisms, moreover, are largely replaced by a few cents worth of simple cams weighing—at most—but a few ounces or grams.

The preferred mode of operation of the FIG. 24 device is quite similar to that given earlier in regard to FIG. 6.

*Record relationships*

A group of records of the type having axially disposed key-slots 21' (not here shown) in each of their central collars 38 for engagements with spline 86, may be normally loaded to record-player 3$^c$ from the inverted container 10$^a$ or the like, and the latter incorporating a suitably formed central hole for engaging the spindle 85'. If preferred to employ the loading technique first explained in relation to FIG. 1, a container 10 would be indicated with obvious means for its balanced support over the spindle tip 190 at shoulder 191. If, however, it is desired to have container 10$^a$ follow the records to their lowermost support not shown), as post-played records, a container 11 of the FIG. 2 type may be used having an axial opening therein just large enough for freely threading such a container over the spindle.

According to this technique, an automatic contactor device 140 (see FIGS. 1 and 4) would also be incorporated in spindle 85', for coaction with the container main body in the manner hereafter set forth relative to said FIG. 1; a lid 10' or the like, having a central aperture of suitably modified dimensioning but not there shown, being also loaded to the instrument along with the record stack 8$^a$. The aforesaid "lowermost" record support may be provided as shown in FIG. 2, for example.

Upon starting the record-player 3$^c$, the lowermost record 169 would, according to one method, be first released from the stack 8$^a$ and transposed initial to the position of record 168; the upper changer mechanism, as herein generally indicated, having been operated from cam 188 and pad 189 to cause fingers 160 to engage the next lowermost record while dogs 159 are being simultaneously retracted, as already foretold relative to record 162. Thence, in the position of said record 168, said lowermost record is transcribed as follows:

First, the tone-arm 192 having stylus 193 moves into the record circle from its stand-by position, according to FIG. 2, and a landing contact is made at the initial starting point on the upper A side of the record substantially as indicated: this being, of course, the exact same starting point for playing the A sides of each succeeding record of the group. As in general explained previously, relative to FIG. 2 and later FIGS. 5 and 6, the equivalent lower tone-arm 192' having stylus 193' will duly begin playing the B or underside of the record at the area of the so-called lower, inner overlap 33 of FIG. 12, just prior to the completion of the traverse of stylus 193; but not, preferably, before the automatic lowering of said lowermost record to the position of record 169—arm 192 following it downward in the approximate manner of arm 14$^a$ of FIG. 6.

The stylus of arm 192 on normally entering the upper terminal groove—or as otherwise actuated—then automatically moves back to its aforesaid stand-by position while arm 192' and stylus 193' continue their traverse in non-skip synchronization.

The means for transposing a playing record from upper to lower transcriptive positions have already been described relative to jaw-locks 171 and wing-cams 172, 173. But it should be mentioned, at this point, that owing to the presumably light needle contact of stylus 193, but without compensatory stabilization afforded by a component such as wheeels 84', 84'' of FIG. 6, the descending record will tend to describe a slight tilting movement as seen at the intermediary position 169'. Since in practice and in actual scale the distance between the upper and the lower playing positions will be slight and the transition from one to the other quite brief—and since, even with exceedingly minute sound tracks, the reproductive stylus will not jump the groove unless the whole machine is tilted to an extreme angle from the vertical—there will be no impairment of tone quality during these operations.

In fact, the lowering of the record can, if desired, be facilitated and controlled by the rapid but graduated action of the wing-cams, as already explained, in cooperation which the appendant guide-bars 171' of jaw-locks 171, which latter close quickly progressively inward out of the record path during the descent of the record. Thus, while a very brief bind occurs between the record and bars 171', moving co-rotatively, this action is quite unlike an objectionable direct, record-to-spindle bind; that is, against an unyielding member. The yielding, rapidly diminishing bind of bars 171' actually aids stabilization of the record against undue tilting movement until said bars are entirely out of the way and the record is resting on the lowermost jaws of jaw-locks 170.

Thereafter, the general further procedure may be according to the technique which was detailed in connection with FIG. 6, whereby fully continuous transcription of all the records can take place from side to side and record to record.

It is quite obvious that the cyclical movements of the lower jaw-locks 170, relative to each record held and thence released thereby, will take place independently of the action of the locks 171. In short, by operating either the pinion 184 and driver 185 for rotary movement of cam-rod 161, or the schematic cam wheel 186 relative thereto—inclusive of cam wheel 188 for raising or lowering the upper changer cams on inner rod 161'— every required flexibility may be had for coordination of the respective tone-arm movements. And these, too, as to mechanical incidentals, will be according to the known skills of the art in view of the instructions herein given. Any known suitable means may be used to rotate spindle 85'.

I wish it understood, at this point, that the provision of bars 171' is merely a refinement and that with ultra light pick-ups, they are not deemed essential for successful operation. Thus, by option, these could be amputated, the respective jaw-locks 170 and 171 brought rather closely together, and the respective records played and transposed by dropping each partially played upper record from locks 171 to locks 170 a distance far less than the usual maximum drop of standard tone-arm pick-ups. If it is desired to employ the technique of FIG. 2, the respective locks and cams can be differently configured, enabling each initially transposed record to by-pass locks 171 and be rotated at locks 170 while the next record in order is received on this first record until securely engaged by locks 171.

According to this option, it will of course be necessary to design the upper and lower jaws of locks 171 (see element 23 of FIG. 7) so that they can duly and properly engage each follower record before release of the lead record directly therebelow; that is, more especially, with ample clearance between the lower jaws of locks 171 and the suitably flattened upper jaws of locks 170. These, however, can be in offset locations. Obvious other changes in the configurations of the respective cam members, including the sub-cams, will also be required, working within the lessened area of space inside spindle 85' between the cams 172, 173 and the step cam 178.

For example, wing cam 172 need not be nearly as long, in practice, as shown in FIG. 24 to provide ample take up for the vertical movements of rod 161, and the top of cam 178 might be made quite flat just above the area of its uppermost contact with the flattened locks 170; and/or the locks 171 could be so formed as to be actuated by wing cam 173 at respective areas higher up than indicated in the drawing.

*Other considerations*

While spindle 85' is presumably the size of standard small diametered turntable spindles, there is, of course, no objection to having it conform to the dimensions of records formed with relatively large central apertures. In other respects, the records $8^a$ are preferably according to those shown in FIGS. 1, 11 and 12; and they are preferably of the light-weight type, of small diameter, having brief, long-playing sound tracks.

The upper spindle-tip or button 190 can, of course, be operated manually to rapidly consecutively drop a predetermined number of the lowermost records whenever it is desired to play one or more records selectively—changing quickly to "automatic" by operating the usual conventional button, toggle-switch or the like (not shown). In such operations, the numerical and titular indicia carried normally on the upturned lower side of container $10^a$—in plain view while making such selections—is a great aid to the operator; as see FIG. 14 and the data hereafter given in regard thereto.

While it is not deemed commercially advantageous to play disc records having sound tracks of variant lengths, in non-skip sequence, I do not wish to entirely exclude this possible mode of operation should future demands warrant. Quite briefly, therefore—and utilizing the instrumentalities herein disclosed—it is thought that such an end could be attained according to the fragmental view of FIG. 23. Therein is shown a novel tone-arm 194 bearing a duality of pick-up styluses; namely, stylus 195 and stylus 196. The specially impressed record 197 has two sound tracks 198 and 199 in twin-spiral configurations: that is, side by side. In the broken open view, track 199 is preferably deeper and is not a music groove. Instead, it is preferably quite smooth and is traversed noiselessly by stylus 195 while stylus 196 is traversing sound groove 198.

At the critical point in the travel of stylus 196, where it is desired to effect synchronization of two different record faces at a so-called overlap area, the original master of record 197 is so made that the cutting stylus produces the abrupt raised area 200; so that when stylus 195 reaches such a ridge—position 195'—means in structure therewith can close an electrical circuit, as exemplified by the contact 201; thus instantaneously actuating the tone-arm pick-up related to the record face which is to be synchronized to quickly land on the overlap corresponding thereto. Stylus 195 is suitably advanced ahead of stylus 196 to compensate for the fleeting time lag between actuation and contact.

An initial difficulty may be experienced in correctly introducing such a pick-up device into two contiguous sound grooves; one means therefor being to provide a duality of run-in grooves which gradually converge until they are normally closely spaced, the twin needles landing midway therebetween and being thence guided into the respective right and left grooves automatically.

Photo-electric actuation by means of the sudden vibration of stylus 195 is also suggested. See Patents Nos. 2,359,808 and 2,242,983 to E. O. Thompson. There is, also, the possibility of utilizing two exactly duplicated music grooves; one of which, however, could end abruptly whereby actuation could take place photo-electrically or as otherwise predetermined.

The spiral grooves, to be sure, may be separately imposed on the same record face—one complete recorded set thereof radially inwardly of the other—for co-timed contacts by a plurality of separately mounted styluses. It is obvious, too, that a single tone-arm provided with a plurality of lower pick-up needles thereon may have other beneficial functions.

The last mentioned technique, using structures herein, appears more applicable to phonographic "books," travelogues and the like, wherein it is desired to synchronize a monologue with consecutive frames of a motion picture projector, rather than with the view of playing relatively prolonged musical transcriptions. And, if so employed with projection equipment, the method of providing groups of records having sound tracks of the same exact lengths is still preferred.

*A transitory form*

For reasons which are generally recognized, it is often of greater advantage to provide auxiliary articles operable with sundry types of existing machines than to seek monopolistic ends by limiting such improvements to machinery of a particular kind.

Therefore, records of the type which necessitate respective stylus contacts for movements radially inwardly and radially outwardly of their A and B sides, respectively, are herein supplemented by a similarly key-slotted record which can be contacted and played on machines expressly adapted therefor as well as on prior conventional instruments, having single tone-arms automatically geared to make stylus contacts initially adjacent the respective outer edges of a record; that is, with respect to both A and B sides thereof in alternating relations.

Such a record and such an expressly adapted machine is seen in FIG. 26. In brief, according to this structure, the phonograph $3^d$ may be regarded as a transitory type and the records 202 are, in this particular embodiment, produced for ready interchangeable use on prior phonographs. In brief, the spindle 203 is conveniently of the oversize type previously described, in conformity, with records of a well known configuration, but is divided into a lower section 204 and an upper section 205. Section 205, however, is designed to rotate clockwise according to standard turntables while section 204 turns anticlockwise.

Thus section 205 may rotate on section 204 as a bearing (or as otherwise expertly determined), a slight opening 206 being here merely created to clearly show an extension 207 on which the upper spindle section is carried; and said extension being further conveniently shown as having the axially disposed lower member 208 terminating, in this generally illustrative assembly, in the friction wheel 209 for coaction with drive-wheel 210 of the motor shaft 211. Lower spindle section 204, however, bears the friction plate or wheel 212 for similar cooperation with drive-wheel 210 whereby said section 204 is automatically driven in an opposite direction with the motor operating at a normal constant speed.

Needless to say, the arrangement of the drawing merely shows one kind of mechanism for producing such cooperative movements as explained; and said mechanism is not here mechanically coordinated with the record-changer means per se. The latter, however, can readily be engineered in conformity thereto, in view of the basic means disclosed. For one brief example, the inner member 208' within element 208 may be employed as an equivalent of the so-called star-wheel shaft identified as element 7 of the aforesaid RCA Victor Service Data bulletin No. 5 for 1949; said element 7 being used to operate record-changing mechanism comparable to that which includes shelves 5, 5 of FIG. 26.

Other features, not greatly dissimilar to those given in earlier exhibits, include an upper spline 213 on section 205 and the short lower spline 214 on section 204. Thus also the retractable V-jaw supports 215, in both upper and lower assemblies, are provided with respective, more outwardly protruding lower jaws 40ᵃ and the relatively recessed upper jaws 41ᵃ. And each set of V-jaws 215, which are preferably in upper and lower threesomes, is adapted for 3-phase operation; namely: a first phase whereby only the most outwardly disposed portions of the lower jaws 40ᵃ are in record-receiving positions inside the record path, a second phase whereby members 215 are slightly further extended—see phantom 215'—to bring a received record into securely gripped engagement with both the jaws 40ᵃ and 41ᵃ, and still a third phase whereby members 215 are entirely retracted within the outer configuration of spindle 203 to clear the record path.

*Contra-rotative techniques*

Consequently, when each of the records 202 is transposed normally from supports 5, 5, it will first be driven clockwise by spline 213 while engaged initially by the upper threesome of V-jaws 215; and, on transposal later to the lower V-jaws, will be instantaneously engaged and driven in the opposite direction by spline 214. A brief, typical operation will suffice to explain the method.

According to this embodiment, it has been determined to utilize a container 10 or the like to load the group of records 202 to the machine, in order that their A sides may be uppermost at all times and will be duly so recovered therewithin, in its subsequent position at phantom 10ᶜ—but without reference, at this time, to the lid 10' at phantom 10''. Therefore when the container has been manually seated over the top end of spindle 203, substantially as shown, the contactor 140 will automatically start the machine in the manner explained hereinafter; and instead of lid 10' being lowered first—as later explained in detail relative to FIG. 1—the main container body will descend to said lower position within the preferably somewhat recessed motorboard 7'.

This operation is facilitated by the prior manual actuation of a suitably disposed reject button, to momentarily fully retract all of the V-jaws from the inner record circle, but without yet releasing any of the records 202. The latter, at this time, are still carried as a stack on the shelves 5, 5.

Thereafter the machine can operate fully automatically in the following manner: First, the lowermost record, which is now—for this illustration—presumed to have been record 216, is released by the retraction of shelves 5, 5 while the remainder of the records continue to be supported by blades 6 (see FIGS. 1 and 2). Record 216 will be initially intercepted by the outermost portions of the upper V-jaw members, and thence quickly locked therewith in their second stage of movement as already explained.

In cyclical order, upper tone-arm 217 moves into the record circle from stand-by position 217', landing the stylus 218 as shown to begin playing the A side of record 216. On arrival at position 217'', which is presumed to be the end of the upper sound track of any predetermined length, stylus 218 can quickly enter a conventional eccentric terminal groove and be actuated to cause arm 217 to clear the record circle while record 216 is being automatically dropped by the full-stage retraction of upper V-jaw members 215. The key-slotted record will, quite obviously, be immediately engaged by lower spline 214 and brought into co-rotation with lower spindle section 204 before settling down on the lower V-jaw members which, in cyclical relations, are extended to respective positions 215'.

In predetermined order, the lower stylus 218' of arm 219, already poised in the position shown, rises into landing contact with the underside of the record—also adjacent its outer edge. And while stylus 218' is playing the under side of record 216, at position 216', the next lowermost record 220 (container 10 being presumably at position 10ᵇ as aforesaid), is automatically transposed to the position just previously occupied by record 216 on the upper V-jaw members 215. Arm 217 then, in sequence, moves to a poised position just above record 220 ready to make landing contact—as at position 218—on completion of the B side of record 216 at position 216' therebelow.

Such a transition from the B side of one record to the A side of the next in sequence can be effected even quicker than from one side to the other of the same record. Thus, as soon as arm 219 moves to position 219'', at the end of the sound track on the B side of record 216, stylus 218' will be oscillated or direct-actuated by the lower terminal groove; and the mechanism which is thereby tripped—including the retraction of arm 219 to clear the record circle—can coincidentally actuate upper arm 217 to immediately land stylus 218 on the A side of record 220: thus completing the cyclical relationships between the respectively mentioned records, tone-arms and changer mechanisms which began with the initial transposal of record 216 to the upper playing position on spindle section 205.

The playing sequences can thereafter continue automatically until all of the records 202 have been transcribed on both sides and are resting once more as a coaxial stack within the main container body at position 10ᶜ. Only the action of lid 10' remains to be explained. But lid 10' will coact no differently with shelves 5, 5 and complementary blades 6 than one of the records 202. The lid, however, being the last of the objects to drop from shelves 5, 5 will cause a second actuation of contactor 140—theretofore depressed but thence freed to re-open the circuit—whereby the machine may be stopped and lid 10' allowed to descend to position 10'' to automatically reclose the container.

In the simplified apparatus of FIG. 1, to be more fully detailed in relation to FIG. 4, element 140 merely starts and stops the phonograph; but it will be made clear, in the course of said later further explanation, that contactor 140 could have the alternative or additional function of a conventional reject button, whereby to accomplish a duality of objectives coincidentally.

Inasmuch as it would be normal, hypothetically, for lid 10' to drop to the position of record 216 of the drawing while the last of the records 202 was being played on its B side by stylus 218', at position 216', and normal also for arm 217 to return to its poised location, it is desirable, in this particular arrangement, to idle arm 217 while still at stand-by position 217'; and, without yet stopping the phonograph, to allow arm 219 to finish the B side of the last of the records. But on returning to its own stand-by position 219', it, too, should be idled, and both upper and lower V-jaws 215 automatically retracted to clear the record path for the aforesaid descent of lid 10'.

Such operations can be accomplished automatically by suitable direct and delayed-action mechanisms, when properly entrained with element 140, for the reason that each of the tone-arms is individually controllable as are the respective upper and lower V-jaws 215. Said components, therefore, can be geared for synchrous, intermittent action as well as for special coincidental actuation as aforesaid. As such coperative movements, including provision for the required parts and the electric wiring, are now regarded as matters of straightforward engineering, detailed apparatus therefor is not graphically shown.

*Alternative techniques*

If, however, the resultant changer mechanism would be rendered undesirably complicated and expensive, it is simple enough to omit element 140 from phonograph 3[d], utilizing instead the technique to be explained shortly with reference to FIG. 1. That is, a container of the type which is adapted to remain engaged in an inverted position over the top of spindle section 205 could be employed for both loadings and recoveries of the records. In that case, of course, it would not be desirable to recess the motorboard 7', and lid 10' would be initially dropped directly to its record-supporting position by operating a conventional reject button to momentarily clear the record path of V-jaws 215—as see also said later more detailed description.

Alternatively, the loading and unloading technique elsewhere given with reference to FIG. 2 may be employed.

Still other modes of operation are inherent in the FIG. 26 machine. According to one of these, a single tone-arm 221, having an upper stylus and a lower stylus, as generally indicated, could be used. If it is desired to utilize records having sound tracks on both A and B sides beginning adjacent both their upper and their lower edges, arm 221 at position 221' could initially engage the inverted A side of a record 216, for example. Since on 7-inch long-playing records the sound track is quite narrow, its traverse by tone-arm 221 would be completed at position 221'; and on actuation, as by entering a standard run out groove, arm 221 may quickly clear the record path to permit record 216 to be transposed normally by the upper V-jaws 215 to the lower set thereof on spindle section 204.

Conformable to this technique the tone-arm operates from hypothetical pivot point 222, enabling it to be readily and quickly returned and lowered to play the upper or B side of the record—at position 216'—beginning at the contact point 223 and utilizing the lower pick-up stylus. The contra-rotated record would, then, be fully and finally played on arrival of this stylus at point 224; after which arm 221 would be actuated to clear the record circle while the played record dropped to container 10 at position 10''. And as another record, in the meantime, will have been normally lowered to the upper position formerly occupied by record 216, said arm can quickly make a stylus contact therewith in the manner previously explained—and so on in succession until all of the records 202 have been transcribed and are resting in container 10'.

This method, obviously, presents no problem of idling two tone-arms at different times. Therefore, when the last of the records has been played on both sides and dropped to container 10, arm 221 would, without changing its normal cycle of operation, move to its stand-by position and be thence automatically idled by the transposition of lid 10' from shelves 5, 5, whereby to free element 140. Obviously, such a method could employ element 140 to not only stop the phonograph but to automatically fully retract both sets of V-jaws 215; thereby clearing the record path from top to bottom.

If, however, it is desired to materially further shorten the sound gap from side to side and record to record, the records can all have sound-tracks which begin at run-in grooves between the label areas and the sound tracks on both upper and lower sides thereof. And while records so characterized may have eccentric terminal grooves, just inwardly of their peripheries on both A and B sides, it is preferable—for the sake of speedy operation—that each record side shall merely have a run-out groove (not shown) which quickly whips the stylus to an exact outer location on each record and each record side at which automatic actuation of the tone-arm can occur without benefit of the usual oscillatory movement, with its attendant delayed action and relatively slow motion of the tone-arm.

*Still other options*

According to this system, and operating from midway pivot point 222, the upper stylus of arm 221 may begin the sequence by moving in to contact the inverted A side of a record 216 or the like at position 221'. Obviously, with position 221 representing the location of the tone-arm at said run-out groove, where automatic actuation invariably occurs, the movement to clear the record circle can be quite brief as the stylus will leave the record surface close to its outermost edge. With the record dropping instantly thereafter to position 216', the tone-arm can re-enter the record circle again very quickly and begin playing the upper or B side at point 224, which on such records, is but a short distance inward from their peripheries.

The remainder of the cyclical operations, until all of the records 202 have been played and re-filed in container 10, will be self-evident in view of the preceding recital. Means enabling the tone-arms to merely move further inwardly for landing contacts, instead of landing adjacent the periphery of a record, as well as mechanism to control each of the required other movements thereof, as related, will be elementary to skilled instrument makers of the art and need not be given herein.

It is further evident, incidentally, that a plurality of techniques may be employed by option with a single tone-arm, whereby both sides of a record can be played in rapid succession while rotated solely at the position of record 216. If such a record had a lower sound track which begins between the label area and the run-out, the upper stylus of arm 221 could make contact with the inverted A side at position 221'; and on arriving at position 221 it would quickly clear the record path and begin playing the upper or B side of the record radially inwardly.

On arrival at position 217''—of the arm 217, that is—it could be thence actuated by an inner eccentric or a run-out-groove at a fixed inner location, comparable to the exactly positioned outer run-out, as proposed, whereby to clear the record path for the next descending record. See said reference to the patent to Wissner for details concerning tone-arms of the type last referred to. And by utilizing a tone-arm such as detailed in said Patent No. 2,281,541 to Edward F. Andrews, which has but one stylus but is adapted to be rotated in such manner as to engage both the A and the B sides of a record successively, it is evident that a record 216 may be somewhat similarly transcribed.

That is, the single stylus of such a tone-arm, and the latter operating from pivot 225, would make its initial contact at position 221', moving thence to position 221; and, by a combination of partial rotary movement and actuation to land it at the position of stylus 218 adjacent the upper peripheral edge of the record, it would thence complete its traverse from this point inwardly to position 217''. See, for instance, said last named Andrews patent with reference especially to FIGS. 11 to 14 thereof. And see also FIGS. 31 to 35 of Andrews No. 2,281,548 for one type of assembly which includes a duality of tone-arms mounted for independent contacts with the respective sides of a disc record.

*Selective playings*

With reference, now, to FIGS. 13 to 17, preferred means are therein shown for playing records of the type herein described individually-selectively; but see also the modification to be later explained in connection with FIG. 5, and modified further to accommodate the special records adapted to engage splined spindle 85 of FIG. 6.

In FIG. 13 the records 99 are supported releasably on the right and left record supports 5, which operate in coaction with right and left conventional slicer blades 6; but for such assemblies it is provided that, during selective operations only, the members 5 may be operable independently of members 6, in the manner which will be detailed shortly in relation to FIG. 17. Within the upper area of spindle-post 4 area windows 100, through which at least a dual plurality of very thin individual knives or blades 101 are adapted to protrude retractively. Each of the knives 101 corresponds to one of the records 99. There being 10 records in the stack shown, a total of 9 knives 101 at each window may be employed in conjunction with the shelves 5.

The approximate arrangement of these knives can be more clearly seen in FIG. 15, as viewed from above; one set thereof, exemplified by the upper knife 101', being preferably carried from a pivot pin 102 and the opposite set, topped by the upper knife 101'', carried from a like pin 103. The two upright pins or pivots 102 and 103 are conveniently utilized for the swingable support of all the respective knives. Each of these is conveniently mounted in assembly with a torsion spring 104, one end of which—also by convenient arrangement—bears continually against the wall 105 as indicated, and the other end of which is restrained by a stud 106. These springs tend to maintain the knives within the windows 100 at positions 101ª until, upon selective actuation by cam-pins 107, carried from opposite sides of the rotatable and desirably knurled indicator knob 17, they are forced outwardly in duality substantially as shown, so as to support all records above a selected record to be played.

The exact shape of these knives can best be determined by skilled designers of the art; it being merely indicated that, if desired, a definite temporary stop point 109 may be provided where each cam-pin 107 could come to rest when knob 17 has been twirled to the correct position. Thus as each such position, represented by the respective pairs of knives 101, will be clearly indicated by numbers on dial 110 (here conveniently limited to numerals 1 to 8 inclusive), it is a very simple matter to quickly turn the pointer 111 to the number corresponding to the individual record to be played and drop this record uppermost, on the thus divided stack, to its playing position.

For while said uppermost record will not encounter any of the knives, the remainder of which have not been actuated and remain entirely within the inner record circle, the pair of blades corresponding to the selected record can enter in between it and the record directly thereabove.

Any suitable means may thence be employed to maintain the standard slicer blades 6 in an idle relation while retracting the primary supports 5. Among the sundry alternatives, which will readily occur to skilled technicians, is the upper, self-returnable push-button 112; said "button" being merely the top of a small shaft 113 and the latter operable within the knob member and independently of the latter's rotative movements.

Such a push-button may, for one example, be suitably connected up to the shelf 5, FIG. 17, through the link 114; said link being adapted, in turn, to actuate the bell-crank 115 from pivot 116 substantially as indicated. Obviously, this arrangement is purely schematic, and the preferred assembly will be that one which best coordinates with the remainder of the record-changer mechanism.

Any preferred means may be employed to automatically return button 112 after each actuation.

FIG. 16 further illustrates the relative locations of the cam-pins around the knob column 17, with the uppermost blades 101' and 101'' being shown in process of actuation by right and left cam-pins 107.

*Container adaptations*

Although the records 99, per se, can be loaded entirely manually and thence selectively separated and played with the aid of the mechanism just explained, it is ordinarily desirable to employ the container member 10 in combination; since the titles of each of the records of a given group will be clearly written or printed on the label 114, normally affixed to the upturned bottom of the container. The correct file numbers of the records will also be given, as briefly indicated in FIG. 14; and when such a container is inverted and engaged over the upper end of the post 4, whereby to load records 99 thereto as one quick, accurate operation, the annular flange 115 will hold it thereon until removed manually—thus bringing all of the record titles and numbers into immediate view as indicia for the aid of the operator in quickly selecting one of the records and operating indicator 111 accordingly. Of course any other, later selected record, which is still supported by the spindle, can be separated and dropped to its playing position; and, as clearly shown in FIG. 1, wherein the container lid 10' was previously dropped to the turntable position, any currently unplayed, previously dropped record or records can be instantly returned to its or their lately occupied spindle position or positions and the foregoing procedure repeated at will.

In performing such an operation, the operator merely places the thumbs of both hands on opposite upper sides of container member 10, and, with fingers extended downwardly, gathers up the lower record stack, lid and all, and draws it upward to its previously supported position before another operation of button 112. For facilitating such rapid recoveries, the motorboard 7 may, as required, have an annular recessed area, or a duality of spaced recesses, 116 to permit of ready finger engagements with the under side of lid 10'.

*The auxiliary indicia*

In FIG. 14 area 38 is the recessed axial collar of record 27 or the like; and, in this instance, such a record is specifically identified by one of the numerals on the containers label 114. As the containers 10 of the 7-inch record type—approximately—are quite light, when fully loaded, they can be very quickly turned over while held by the edge in one hand—larger sizes of containers requiring the use of both hands for obtaining a ready view of their lower sides. In practice, therefore, it may be best to employ but a narrow band type label for record titles and numbers on the bottoms of such holders.

The pictorial subject matter, including optional advertising, can then occupy practically the entire annular area of the lid except for the central opening therein—as later explained more fully. In special magazine or so-called phonofile sets, a series of views descriptive of each record thereof can be imprinted in a somewhat panoramic effect around said opening. Alternatively, in an operatic sequence, such views might depict outstanding episodes of the opera. And each small view could relate, if desired, to a particular record to be electively played.

It is believed that a series of interesting, well executed small views of this order will be more appealing, and stimulate a greater interest on the part of prospective purchasers, than a single larger view in poster style, such as commonly employed on individual album covers. Thus in FIG. 14, for example, the small fragmental scene is a direct tie-up with numerical indicia including the title of a record "Home on the Range," constituting FIG. 7 of this group and emblematic of ". . . where the deer and the antelope play . . ." The pictures per se are therefore an actual auxiliary aid to the operator in making individual selections, and, thence, in operating the selector mechanism.

For the use of lecturers, using disc phonograph records in connection with projection equipment in darkened interiors, the numerals on dial 110 can be luminous. This would be especially advantageous for transcribing illustrated medical and/or surgical lectures by eminent specialists, for illustrated sales talks, for showing "canned" military strategies, and in various other applications including travelogues.

Obviously if it is desired to selectively play only the under side of a particular record, or records, the whole group may be fed initially to the machine in the correct reverse positions therefor—see later reference to the container of FIG. 6, or its disclosed alternate of FIG. 6, having upper and lower removable lids—or to the machine type adapted to contact and play only the elected side of the record; that is, with tone-arm 14 or arm 15 of FIG. 2 as the case may be. Push-button mechanisms, for changing phonographs from "manual" to "automatic" and vice versa, are exceedingly old in the art and may be readily adapted to the machines shown.

Obviously, too, both sides of any selected record can be played. In 4-movement symphonies, suites and the like, wherein as few as two records are to be played in sequence without reference to like other sub-groups occupying the same container, it is easy to first manually-selectively release any records below the elected ones, utilizing the apparatus including dial 110 and knob 17, followed by the operation of the conventional lever or button (a button comparable to button 136' of FIG. 1, for illustration) to change the instrument back to "automatic" operation.

Thus, if records 116, 117 of FIG. 13 constitute a symphonic sequence to be selectively played, the simple procedure would be to first convert the machine to "manual," turn the indicator 111 of knob 17 to the correct number represented by the *lower* record 117 on dial 110, and depress button 112 to release only the two lowermost records therebelow to the positions of post-played records. The machine is then converted back to "automatic," as by pressing button 136', and records 116, 117 played in continuity from side to side and record to record.

A similar technique may be followed for playing a single record, on its A and/or its B side or sides.

Where several such magazine sub-groups can be filed within a single container, fed to post 4 as one exceedingly quick operation, a selected sub-group thereof thence played and later removed in completely re-filed order as but one other simple operation, the advantage of being able to handle and play and repossess such records in the manner explained is most apparent.

These brief operations are in sharp contrast to the relatively archaic method of unhandily, direct-manually removing a selected symphonic set from particular album pockets—often accompanied by injurious finger-marking—thence manually feeding the records to a phonograph and later returning them in the same cumbersome, unhandy manner. For in either case the "manual" and "automatic" adjustments of the machine would be performed where automatic record players are used.

Similar means for playing the records individually-selectively on the machine of FIG. 5 is briefly indicated, wherein each of the posts 83 may be of a sufficient diameter to house both the automatic mechanism and the knives 101 operable through right and left inwardly disposed windows 100', 100'. In this assembly, it is desirable to provide but a single dial 110 (FIG. 14), in combination with the one knob 17' and button 112', whereby, on operating the same, dual actuation will take place as generally indicated by the right and left miter-gears 118, 118' and 119, 119'.

Such mechanisms may also be operated from remotely controlled dials.

In the case of phonograph $3^b$, while a showing therein of the selector mechanism has been purposely omitted, to avoid overcrowding this drawing, it is elementary that a duality of upright stanchions such as posts 83 of FIG. 5, for instance, can be employed; and these, to be sure, could also carry the relatively simple other instrumentalities necessary for either automatic or manual operations of supporting wheels 84' and 84''.

Since so many features of the invention, while very easy to comprehend, call for extended descriptions, the selector mechanism has been graphically limited to the simple apparatus of the drawings. This is deemed adequate for most applications. If cost is no barrier, however, it will—after the benefit to be derived from this disclosure—doubtless occur to sundry skilled persons that the individual-selector component can be further improved.

In short, it could be made *pre-selective* in that a given particular number of the records might first be prepared for successive playings, as by successively pressing first one and then another of a plurality of individual small selector buttons—not shown—located around dial 110, and each corresponding to a particular record (if according to their consecutive positions and not merely at random up and down the stack), followed by final pressure on a master releasing button, controlling the respective blades 101 or their equivalents, to thence automatically drop and play each pre-selected and pre-set record in continuous sequence.

The required, necessarily compact mechanism therefor, while not shown, may readily be derived from well known devices, including sundry forms of ratchets and cams exemplified by the machinery of time-clocks, filling and weighing machines, packaging machines and sundry. More specifically, however, see said patents to E. F. Andrews, wherein a comparable result is obtained by differently adapted phonographic structures.

*Adapter devices*

In playing records on machines which do not have the individual-selector mechanism embodied therein, the records can be readily selected and played with the aid of a manual adapter, as first more fully disclosed in as see said former co-pending but later abandoned application, Phonographic Apparatus, Serial No. 589,322. For the special accommodation of containers 10 and 11 having oversize axial openings, I provide the specially formed adapter 118 of FIG. 22. This comprises merely the spool-like base and handle portion into which is doweled or otherwise affixed the spread spindle member 119; the latter being conveniently of a plastic material and produced as a spider to economize material. The spread lower area of spindle 119 is received through the axial openings 120, FIG. 1, of each container lid member so so that, in magazines having the reduced bottom openings 121 (see said FIG. 1), only the shoulders 122 of FIG. 22 and post 123 will protrude therethrough.

Such a configuration causes an accurate, automatic co-registry of the respective divisible container members, as was fully explained co-pendingly, when they are instantaneously—and even quite carelessly—re-united manually to re-close the magazine. Post 123 may be of any desirable length for the momentary appendant support of the loaded or partially loaded container, when held securely by the thumb and one or more fingers of one hand.

The lower handle portion is dimensioned for a mere deft thumb-and-two-or-three-fingers grip of the opposite hand, as distinguished from an unwieldy palm grip.

To re-close a container 10 by re-engaging it with a lid 10', bearing a plurality of records thereon, it is only necessary that the relatively small spindle portion 123 shall be thrust—from the rear—through the much larger opening 121 of the container proper and the respective elements pressed together. This insures a perfect, instantaneous closure, following which the adapter is removed and the closed container dealt with as elected.

Clearly, if the records 27 are to be used interchangeably on other phonographs, for individual playings, a different kind of adapter will be required on standard turntables. For this purpose I provide the auxiliary adapter 124 of FIG. 18, which, in this version, is conveniently comprised of the hollow annular device substantially as shown, having an upper axial opening just large enough to accommodate the short spindle 125 as a "manual" record-player.

However, as indicated in phantom, adapter 124 may have side walls sufficiently high to accommodate any predetermined number of records 126 to be manually loaded and played; and it, obviously, can also be readily threaded over long turntable spindles or those having conventional off-set portions serving as single-support record shelves.

Inasmuch as many standard turntables are formed with a central, upper recessed area of substantial size surrounding the spindle, it is possible to supply adapters having a lower flanged base to rest within such recessed areas; thus enabling the operator to lift off any one or more played records by simply taking hold of the protruded upper part of the adapter. However, and with especial reference to records 27, 126 and the like, having the thin axial collars 38 of FIG. 12, such flanges 127 can be of a blade-like thinness to be received just underneath the lowermost record of a manually played stack; thus enabling the whole stack of records to be first played on and then removed simultaneously from a flat-topped turntable. They need not extend beyond the area of collars 38.

I am aware that a somewhat comparable device was earlier disclosed in Patent No. 1,471,092 to Blaha; but it would be impossible to thread the Blaha record-lifter over modern elongate spindles, especially those having offset record shelves in structure; and said prior art devices require that standard spindles shall either be "turned down" to less than standard diameters therefor, or, else, be utilized therewith by providing records having axial openings dimensioned in exact conformity thereto. Nor does said prior art device provide brief flanged base portions adapted to be received just underneath record collars 38, for use on entirely flat existing turntables.

For use, primarily, with newly constructed turntables, however, wherein it is desirable to provide a non-removable adapter, I also provide, by option, the extendable and collapsible device 128 to which spindle 125 or its equivalent is, in this conveniently shown modification, integrally affixed. The lower base portion of the drawing carries a plurality of small upright studs 129, in an interrupted annular formation—or perhaps only a threesome thereof—so spaced as to present record receiving means which are a beneficial equivalent of the device 124.

Posts 129, of course, are preferably protrudable through a series of holes of only slightly larger diameter in the wall of turntable 130; but not necessarily so as, among the obvious alternatives, posts 129 could be replaced by an annular sleeve movable through a suitably conformable axial opening and adapted to support spindle 125 in its playing position. In operating such telescopic devices, whereby to accommodate selected records having said oversize openings, it is merely necessary to take hold of the spindle and pull upward thereon against the yielding resistance of any suitable resistors 131 or their equivalents.

According to yet another option, the records 126 can be adapted for small diameter spindles by the provision of inner circular discs 132, FIG. 20, which may have only temporary, wedge-tight engagements. Such discs may also be provided in duality with gummed faces to be brought into moistened, face-to-face contact with each other as indicated and with the overlapped rims at areas 133; or they may be formed with flexible, rubbery perimeters grooved for pressure engagements with said axial collars 38 of the records.

In order to play the B sides of the herein described records manually, on ordinary machines, it is merely necessary to start the pick-up needle in the specially provided inner run-in grooving 34 of FIG. 12 instead of adjacent the record's periphery, as in the case of the A sides thereof and standard record discs. By obvious adjustments, the tone arm movements of automatic phonographs, of more conventional type, could be readily modified to accommodate both A and B sides of these records.

*Other adaptations*

In and in combination with the phonographic species of FIGS. 2, 5, 6, 24 and 26, including auxiliaries, the major features of the invention are graphically disclosed; but certain of these are further amplified in FIG. 1, especially as to the containers or so-called phonofile magazines. And said FIG. 1 view further serves to clearly show how particular components of the invention may be readily adapted to existing phonograph instruments; namely, those having spindle-posts of the aforesaid oversize type.

In short, it is obviously unnecessary that the center posts 2 shall be splined—as in FIGS. 2 and 5—in order to utilize either the records 20, 27 or the like and containers 10, 11′ or 11″ on the phonograph 1. And in common with the method normal to the aforesaid phonographic species, it is the simplest of procedures to load record groups from these containers to the record-player of FIG. 1, and to instantaneously recover the completely refiled and fully protected records thereinto *with less manual effort than required to remove even a single disc record from an ordinary album envelope, and later return it to said envelope.*

Indeed, according to one preferred option, a normally closed container, with a whole magazine set of records therein, need be merely deposited on the machine. The phonograph itself (1) removes the lid and opens the container, dropping this lid along with the lowermost record to the playing position, (2) automatically lowers and plays each and all of the records in sequence, and (3) re-closes the container and re-files the post-played records by merely dropping the inverted container proper down over the record stack, resting on the upturned lid therebelow. And when the main container has been dropped, the phonograph stops itself automatically before the tone-arm can swing back into its record-contacting position: thereby avoiding injury to the pick-up stylus.

All such operations (and including selective playings as aforesaid) are performed *without any contact whatever of human hands with a record surface.* It is well known that the No. 1 evil in record wear is atmospheric dust, more especially dust which becomes embedded in delicate sound grooves at areas that have been previously finger-marked. This evil has become greatly magnified and aggravated with the advent of exceedingly minute needle grooves, wherein such grooves are contacted by equally minute, delicately formed pick-up styluses, exemplified by long-playing sapphires.

Such records play with very high, improved fidelity of tone only when both the grooving and the sapphire needle are not impaired; but following continuous abrasive wear and tear thereon of minute dust particles, grinding against both the stylus and the sound track, the original tonal quality of a record soon deteriorates to a much worse degree than that occurring with prior records under like circumstances. This difficulty is substantially cured and circumvented by the present invention.

Before describing more preferred loading and unloading techniques, utilizing the disclosed containers or magazines, one or two simple adaptations of these to existing phonographs will be given.

Ignoring certain optional elements in phonograph 1, FIG. 1, which are also incorporated in the machines of FIGS. 2, 5, 6 and 24, this record-player per se is recognized as of a conventional, existing type. In order best to accommodate the use of container member 10 therewith, this particular form of magazine, having said opening 121 and contiguous flange 115 (FIGS. 13 and 14), is adapted to be inverted and thence received and supported on spindle 2 for depositing a record stack on shelves 5, in exactly the same manner which was detailed relative to the operation of the selector mechanisms of FIGS. 11 to 17.

The lid 10', having double-friction grooving 134, may either engage the annular edge 135 just snugly enough to be readily pried or flicked off by a rapid finger movement of the operator, or lid 10' may engage the container proper so loosely as to drop of its own weight to the turntable position, after the manner of an actual record, upon manual operation of reject button 136. Preferably, however, the axial flange 137 is of a thinness to closely snug against the underside of the collar of the lowermost record 138; so that when the closed magazine is first deposited on spindle 2, and manually released, lid 10' becomes automatically disengaged by the weight of the record stack and the latter, with lid 10' therebelow, slides slightly downward to the position of said supports 5.

Thus, by only a single operation of button 136, lid 10' and record 138 are simultaneously released to the turntable position with this record in readiness to receive the tone arm stylus. When all of the records have been automatically played and are resting on lid 10' at the base of post 2, they may be entirely re-encased and quickly lifted off the instrument, along with encasing members 10 and 10' in the same manner, using simple thumb and finger contacts, as was set forth in relation to the selective record playings and recoveries.

Ordinarily, however, before removing such a record stack, per se, for conventional re-filing, it is necessary for the operator to manually lift off the tone-arm 12 and place it outside the record circle on support 139. With the use of a verdy slightly modified container 10, however, even this operation is eliminated by the provision of means to stop the phonograph, as mentioned previously, while arm 12 is outside the record circle and before it can normally return to its contact position.

*Fully automatic apparatus*

Such means is provided, in part, in the form of the circuit-closing and circuit-breaking contactor 140 which is constantly urged slightly outwardly through narrow window 141 into pressing contact with the record stack. As viewed in FIG. 4, contactor 140 operates from the pivot 142 and is pushed by spring 143. The detailed hook-up with the switch mechanism is not shown but merely indicated generally by the pair of circuit wires 144 and 145, which are self-explanatory; or see Carreau 2,621,047 for one simple arrangement of this general order wherein, in patentee's FIG. 4, the required electric hook-up to his motor 15 is graphically indicated. With express regard to the machines herein, any preferred electrical circuitry with respect to the contactor 140, whereby to sequentially start and stop the automatic record-playing and record-changing mechanism, such as will readily occur hereafter to skilled workers of the phonographic and related arts, may be employed.

It is obvious that when element 140 is unimpeded, the electrical circuit may be broken and remain so until closed by the action of the record stack when only the last of the records to drop would relinquish outside pressure from contactor 140 and break the circuit. But such action, precisely, would be undesirable for the reason that arm 12 would fail to return and play said lattermost record.

In a preferred embodiment, however, flange 115 is omitted and the axial opening 121 made large enough to enable the main container body to be threaded over the spindle; as see container 11 of FIG. 2. Then, when the last record 70 has dropped to its playing position, tone-arm 12 will contact it normally for the reason that the main container, now resting on the shelves 5, continues to depress element 140; the circuit being broken only after tone-arm 12 has normally cleared the record circle and the container, too, has dropped like a record to the position shown by phantom 10$^a$. In doing so it automatically stops the phonograph record-playing mechanism, closes itself, and refiles all the records by its contact with lid 10'.

*It is evident, then, that without even operating the conventional starter button, such a phonograph will be automatically started normally by the mere engagement of such a container and record-stack therewith, and, later, automatically stopped without further manual actuation.*

The entire sequence, to and through the re-closing of the container, is substantially independent of human intervention.

This desirable result may be had by a minor, relatively inexpensive improvement in existing machines comparable to phonograph 1; it being only necessary to slightly lengthen the spindle post 2 (only the upper nose or cap 2' need be so changed) whereby to provide full clearance for the swinging movements of arm 12 when container 10 is at position 10$^b$. According to present phonograph structures, such a container will follow the record stack downward during the transcription of the first few records, after which arm 12 will collide therewith and/or with the lowermost of the records still supported by shelves 5. The break through the center area of post 2, FIG. 1, indicates that it may be of any required length to correct this difficulty.

*Other container features*

The upturned container 11' of FIG. 2 illustrates one means of receiving the record stack, as fully post played records, in the position shown. On this instance, with the A sides of the records uppermost therein, such a container can be seated initially on spindle 4, lid uppermost; thereby starting the phonograph to drop member 11' to the lower turntable location, to be followed in sequence by each of the records and finally by a lid 10'—not here shown—to stop the phonograph and close the container. Alternatively spare container 11' may be first seated as shown and the records loaded to the machine from spare container 11. On manual removal of the loaded container 11', it is a simple matter to place a lid thereon.

If it should be desired to have container 11' and all the post-played records therein remain non-rotative, the turntable 149 can be omitted and the container permitted to rest on the recessed area of motor board 7'. Since the axial opening in container 11' is slotted to accommodate at least one spline 19 or the like—and in common with its lid member—said spline, according to this option, would be terminated at areas 150.

Container 11'' of FIG. 6, having both upper and lower removable lids 151 and 152 is self-explanatory and differs only from a comparable embodiment disclosed in said former co-pending application, Serial No. 589,322, in that a web 153 divides it into separate inner segments; thereby making it possible to file two distinct record groups therein, either the lower or the upper lid remaining snugly closed while the other is removed for record-handling. Such containers may have a plurality of special uses including the filing, loading and repossession of separate symphonic sets of records.

The side wall 154 is here shown of a relatively thick construction, but not necessarily so in view of web 153 which will maintain its shape even when both lids are removed.

It is highly desirable that the containers or magazines shall be so formed that they can be quickly stacked upon one another on a bookshelf or other support, and just as quickly unstack to play the record group of a particular container. This is provided for by the annular bottom recess 155, FIGS. 1 and 2, which receives the raised area opposite the double-friction grooving 134 of any lid member 10' positioned therebelow, in stacked relations.

The small view of FIG. 21 shows a stacked arrangement of containers so formed, and, in addition thereto, a unitary base member 156, central post 157 and carrier-handle 158; the latter components being in accord with a like structure disclosed in said former co-pending case bearing Serial No. 589,322. By replacing post 157 with the suitably dimensioned base of a statuette, adapted to be quickly removed, and formed in the likeness of a musical celebrity for example, such magazine stacks make attractive ornaments for radio-phonograph cabinets, where the records are at all times available for playing by merely removing said statuette and withdrawing an elected container.

Incidentally, in order to readily distinguish one container 10 or its equivalent from others of a coaxial stack, before even separating the stack, and so that such a container may be quickly selectively removed therefrom, still other container-identifying means are provided. Such identifying means may take the form of suitable numerical or alphabetical indicia, exemplified by the encircled As on the container of FIG. 1; it may merely be pictorial indicia—as by means of an annular label or the like—or any other beneficial substitute therefor may be employed. As a matter of preference, the encircled As of the drawing are shown in a spaced plurality of locations whereby at least one of them may be quickly seen without reference to any particular coaxial arrangement of the containers to one another.

Such letters or other indicia on the containers of a small library group can be easily memorized by the operator, without constant reference to other descriptive data; but it is obvious that in relatively large libraries, where many record groups are carried in stacked relation, the method of keeping all the groups filed according to data written on file cards or in a small note-book will greatly facilitate the immediate locating and seizure of a particular container.

While particular components of the invention may, as aforesaid, have other uses, it is evident that a new, fully integrated, interdependent phonographic system has been disclosed, comprising many features hitherto unknown to the art.

It will be understood, moreover, that the foregoing embodiments are primarily illustrative, and, hence, subject to sundry substitutions and changes within the breadth of the means thus featured. My invention, therefore, is not specifically limited thereto or thereby, and solely in accord with the allowable claims herein or to be hereinafter presented.

I claim:

1. In combination: a spindle member over the free upper end of which a stack of currently unplayed, centrally apertured disc phonograph records are threaded downwardly in their respective reservoir positions; a spaced plurality of record supports, serving also as arresting means for single—and singly displaced—records, extensible outwardly retractively from within the exterior configuration of said spindle into the path of a single descending record, said supports being at a location to receive such a record in the initial playing position thereof; means operable to normally singly release a following, and as yet currently unplayed, record from its reservoir position into face to face contact with the top side of said first record while the latter is supported in transcriptive rotation, with respect to the underside thereof, on said first named record supports; other means extensible outwardly retractively from said spindle, only slightly above said first supports, into supporting engagement with said following record; a first combination tone-arm-and pickup member, bearing only a single stylus, on its lower side, positioned as means for normally contacting a sound track on the uppermost side only, of said first record and, thence, operable to clear the record circle and return thereto in a position to begin transcribing the upper side only of said following record while still in said face-to-face contact with the record immediately therebelow; and a second combination tone-arm-and-pickup member bearing only a single stylus, this latter stylus being in the upper side of said combination member and characterized as means for normally initially contacting the lowermost sound track of said first record, and, thence, for clearing said record circle and subsequently returning thereto to begin transcribing the lowermost side of said second record following the operation of yet another means, in combination, for the normal withdrawal of said first record supports from said first named record.

2. In a phonograph, that improvement which includes, in combination: a spindle member over one end of which centrally apertured disc records are received, and means for receiving and supporting a single such record in concentric relation to said spindle; said supporting means comprising at least one composite member movable retractively outwardly into the record path from within the exterior configuration of said spindle, and further characterized as having a farthest outwardly disposable segment which projects into said path according to one phase of its cyclical movements together with a second segment thereof—radially inwardly of said first segment—formed as means for temporarily gripping said single record securely, releasably, at respective upper and lower innermost axial edge portions thereof co-rotatively, in coaction with said farthest outwardly disposed segment, during another phase of said cyclical movements; means being provided, in structure, for moving said composite member in respective record-supporting and releasing relations according to each aforesaid phase of its cyclical travel.

3. In a phonograph, the combination which includes: an upper spindle element, over the normally freely disposable upper end section of which centrally apertured disc records are received and about which they are temporarily supported; a lower spindle element to which such records are subsequently transposed, one at a time, from said first spindle element, and means operable to simultaneously drive said upper and said lower spindle elements contra-rotatively as to each other; at least the lower of said spindle elements bearing thereon retractive record supporting means as well as an outwardly facing element by means of which an individual record is adapted to be singly keyed thereto and rotatively driven thereby while maintained on a momentarily fixed plane of rotation by said record-supporting means.

4. In phonographic apparatus, the combination with an upstanding spindle member which further includes: supporting means for a plurality of centrally apertured disc sound records while occupying currently pre-transcribed positions on said spindle, directly entrained other supporting means therefor when in their subsequently fully played positions; and still other record-supporting means—to which each lowermost record of a pre-transcriptive group is successively transposed and reprodued, on respective upper and lower sides thereof without reversal—intermediary of said first and said second named record supports; at least the "still other record-supporting means" being extensible retractively into the record path of travel from within the external configuration of said spindle member.

5. In a phonograph of a new type, having record-changing and record-playing mechanism capable of being actuated by loading at least one centrally apertured disc record thereto, the combination including: an upstanding spindle member within a hollow interior portion of which record-changing instrumentalities are housed; a record-support extensible laterally from said spindle and characterized as means for receiving said record in its pre-transcriptive position, said support being operable directly from said instrumentalities in respective record-supporting and record-releasing relations; means forming a circuit to be closed; and switch means wired into said circuit; said switch means being provided with an auxiliary means for its automatic actuation to close said circuit incidental to normally lowering said at least one record over the free upper end of said spindle to said record-support, and said auxiliary means comprising a readily depressible member which extends outwardly from an opening in the side wall of said spindle into the path of downward movement of said record.

6. In combination: phonographic mechanism including a spindle member over the free upper end of which disc records are threaded; a container lid member bearing a central aperture of a configuration enabling it to travel downwardly over and along said spindle in concentric relation thereto; auxiliary means, associated with said spindle, to which said lid member is adapted to drop and upon which it comes to rest in a position such that it, in turn, subsequently receives and accumulatively supports such records in the post-played positions thereof in cooperation with said auxiliary means; and a main container member from inside which, in its manually inverted position, said records are relinquished coaxially guidingly to said spindle in respective pre-transcriptive relations; said main container member comprising: a record-aligning side wall element in the form of a cylindrical band of solid, substantially non-porous material such as to effectually prevent the infiltration of atmospheric dust therethrough to the records when normally resting in storage positions therein; and a dust-excluding type of end means being formed with an axial opening of a sufficient dimensioning to enable the whole of said main container member to be engaged over said upper end of said spindle incidental to said record-relinquishing operation, and to be subsequently closed and re-loaded with said records upon the manual elevation of said lid member, in its record-bearing relation, into a normally fitting and closing engagement with said main container member while each of said lid, said records, and said main container member are maintained in respective coaxial relations by and about said spindle.

7. In combination: phonographic apparatus including record-changing means, record-transcribing means, and a spindle member over the upper end of which centrally apertured disc records are received in concentric relations thereto; a container lid member, the latter formed with a central aperture therein as means for enabling said lid member to be readily also engaged over the said upper end of said spindle and, thence, normally automatically transposed from an initial supporting means therefor—extensible laterally outwardly from said spindle—to lid-supporting other means, in structure, for enabling the lid member itself to accumulatively receive successive records thereon and thereabove in currently post-played positions; a main container member from which, in its normally inverted position as a receptacle closed by said lid member, said records are initially coaxially-guidingly relinquished as a unitary stack upon said lid to said spindle member in the positions of records to be successively transposed by the record changing mechanism, along with and following in orderly sequence behind said lid member, from said initial supporting means; said main container member comprising record-aligning side wall means, of substantially circumferentially continuous formation, and an end closure for said wall means, said end closure bearing a central opening therein of a diameter sufficiently dimensioned to admit the whole of said main container over the top of said spindle and, thereafter, such as to also enable this latter named container element, as the last of the centrally apertured objects which are automatically transposed, to follow the last uppermost of said records in successive order to a position further downwardly along said spindle, as well as to thereby automatically re-encase the record stack, resting on said displaced lid member, responsive to the normal cyclical operations of said first mentioned record-changing and record-transcribing means.

8. In a phonograph, the combination—with a spindle member over the upper end of which centrally apertured disc records are threaded, and upper and lower alternating supports extensible retractively outwardly from said spindle into the path traveled by each successive lowermost record to be supported and thence released therefrom—of means to actuate said supports for consecutive cyclical inward and outward movements relative to each other and to said spindle member; said actuating means comprising at least one cam member carried within the suitably configured interior of the spindle in a position to bear successively, and directly cammingly, against each of said upper and said lower record supports; there being one set of such supports operable to releasably receive the lowermost record of a coaxial stack thereof in the initial positions of records not yet currently transcribed, and at least another set of said supports lower down on said spindle, and extensible therefrom, to which said particular lowermost record and each lowermost record to follow is successively received in respective transcriptive attitudes.

9. Phonographic apparatus which includes, in combination: a spindle member over one end of which centrally apertured objects are coaxially threaded, a unitary group of such objects occupying respective positions on an upper sectional portion of said spindle in coaxial relations thereto and to each other, the lowest of the objects being a container lid member, the uppermost of which is an inverted main container body member formed with means for normally engaging said lid member, and the remainder thereof being disc sound records in stacked relations on and above said latter named member, each of said lid, said main container, and said records having a central aperture of adequate dimensioning for its reception over and its travel freely slidably along the major length of said spindle; a first plurality of record supporting devices extending retractively outwardly from said spindle, upon which devices said objects are releasably carried, and a second plurality of record supports which are movable laterally from said spindle partially between said lid and one of said records coincidental with the withdrawal of said first named plurality of record supporting devices from the underside of said lid to within the external configuration of said spindle, the action of the respective pluralities of record supports being normally consecutive in respective supporting and releasing relationships with respect to said objects; a pressure switch having a depressable portion thereof extensible from said spindle into the path of travel of said objects and adapted to be depressed by the innermost edge portion of the first thereof on coming into contact therewith, to be held in a depressed attitude by each and any one of the objects before the latter are successively released downwardly from the lower of the object-supporting means, and to be freed to return to its un-depressed-attitude by the displacement of the last of said objects to be so released; motor means operable to rotate said spindle and said objects simultaneously; elements of an electric circuit to be recurrently closed and re-opened by the passage of said objects and their like relative to said depressable portion of said switch, said elements including wire means interconnecting said switch and said motor means; at least one tone arm having a music pickup member; a turntable concentric to said spindle at a location normally below the location of said respective pluralities of record supports in a position to successively receive each of said lid, said records in their successively transposed relations, and, lastly, said main container member as a re-united composite of record holder and its contents; and means by which said tone arm and said music pickup member are coactively entrained with said pluralities of the record supporting and releasing means, with said pressure switch including said electric circuit elements, and said motor means in respective motor-starting, spindle-rotating, record supporting, record-relinquishing, record transcribing, record re-encasing, and motor-stopping relations.

10. Phonographic apparatus which includes, in combination: a spindle member over one end of which centrally apertured objects are coaxially threaded; a unitary group of such objects occupying respective positions on an upper section portion of said spindle in coaxial relations thereto and to each other, the lowest of the objects being a container lid member, the uppermost of which is an inverted main container body member in a normally fitting relation to and with said lid member, said body member having a substantially circumferentially continuous side wall element, and the remainder thereof being disc sound records in stacked relations on and above said lid member; a first plurality of record supporting devices extending retractively outwardly from said spindle, upon which devices said objects are releasably carried, and a second plurality of record supports which are movable laterally from said spindle partially between said lid and one of said records coincidental with the normal withdrawal of said first named plurality of record supporting devices from the underside of said lid to within the external configuration of said spindle, the action of the respective pluralities of record supports being normally consecutive in respective supporting and releasing relationships with respect to said objects.

11. In combination: a phonograph turntable spindle; a unitary group of centrally apertured objects occupying respective positions on an upper sectional portion of said spindle in coaxial relations thereto and to each other, the lowest of the objects being a container lid member, the uppermost of which is an inverted main container body member in a normally fitting relation to and with said lid member, and the remainder thereof being disc sound records in stacked relations on and above said lid member; and means extensible from said spindle in respective object-supporting and object-releasing positions with respect to each of said lid, said records, and said main container body member.

12. In combination: a phonograph turntable spindle; means associated with said spindle upon which centrally apertured objects are supported releasably in concentric relations thereto, at least certain of the objects being record discs in the positions of records to be transposed and transcribed; and a plurality of such centrally apertured objects resting about said spindle in the positions of objects temporarily supported by said object-supporting means, the uppermost of the objects being an inverted container member having end means and a substantially circumferentially continuous side wall portion internally dimensioned as means to therein maintain a stack of disc type records substantially coaxial to each other and normally coaxially releasable directly from said container to complementary other means, exemplified by said spindle, for directly receiving and maintaining the same in like, pre-transcriptive coaxial relations—hence continuously guidable coaxially during their transposition from one to the other of the respective container and spindle instrumentalities.

13. In combination: a phonograph turntable spindle; a unitary group of centrally apertured objects occupying respective positions on an upper sectional portion of said spindle in coaxial relations thereto and to each other, the lowest of the objects being a main container body member, the uppermost of which is a container lid member, and the remainder thereof disc sound records in stacked relations within said main body member; and means extensible from said spindle in respective object-supporting and object-releasing positions with respect to each of said main container, said records, and said lid.

14. Phonographic apparatus incorporating, in combination: a spindle member having disc record-supporting-and-relinquishing mechanism extensible retractively outwardly from therewithin, and a manually operable auxiliary device for simultaneously loading a stack of centrally apertured record discs over the top of said spindle to said record-supporting and relinquishing mechanism; said auxiliary device comprising at least one component of a dust excluding means with respect to said discs, when occupying idle storage positions therein, and comprising: a container member having a record-confining body portion internally dimensioned of only such slightly larger diameter than the outer diameters of said records as to maintain them instantaneously releasable coaxially through one openly disposable end of the container; said body portion being formed with a substantially fully cylindrical, substantially vertical side wall element of an axial length to encompass said record stack together with an end member, in structure, having means by which it coaxially engages said spindle, said cylindrical side wall component being constructed throughout of a solid, substantially non-porous material such as to effectually prevent the infiltration of atmospheric dust therethrough to the records when resting in said storage positions therewithin.

15. In a phonograph, the combination including: an elongate spindle member over the free end of which centrally apertured disc records are received; a first set of spindle-borne supporting and releasing means for a stack of said discs in their respective positions of currently unplayed records which are to be transposed, one at a time, farther downward along said spindle, and concentric thereto, to at least one record-transcriptive position of each successively lowermost record; other record-supporting and releasing means extensible from within the peripheral confines of said spindle for releasably engaging said each lowermost record at said record-transcriptive position; and record-transcribing means operable to move into and from the so-called phonograph record circle laterally, retractively; said last named record engaging and releasing means comprising a spaced plurality of slotted elements of the general order of V-grips, according to the invention, formed as means for contacting the inner edge of a record disc against movement thereof either vertically or rotatively relative to said spindle while thus positively locked thereto.

16. In phonographic apparatus, the combination including: spindle-supporting means; a spindle member, carried from and vertically erectly above said supporting means, over the free upper end of which spindle centrally apertured disc records are threaded downwardly, said spindle having a plurality of openings formed in the side wall thereof; means to drive said spindle rotatively; and means—including a spaced apart plurality of mechanical jaw members extensible retractively outwardly from within the exterior of said spindle, through said apertures, into respective binding contacts simulultaneously with a record at the innermost axial portion thereof—for maintaining each such individually positioned record, momentarily, against tilting movement abnormal thereto while normally driven transcriptively at an area of the spindle member intermediary of said supporting means and said first mentioned end thereof.

17. In apparatus comprising a phonograph having a rotatable, vertically upstanding spindle member which houses record supporting and releasing elements, and said elements extensible outwardly, retractively, into the travel path of centrally apertured record disc which are threaded slidably over the upper end of said spindle, the combination which further includes: a coaxial stack of such records on said spindle in the initial positions of records to be temporarily supported, as currently pre-transcribed records, by said supporting and releasing elements; means to rotate said spindle member; record-reproducing means; means to receive and support a singly released record, about said spindle, in its playing position, and to cause each successively lowermost record to be transposed downwardly thereto by and from said supporting and releasing elements; means to cause said reproducing means to move into the record path from therewithout, and to make landing contact against each transposed record, to play said each record, and to move outwardly from said record path; a record-contacting member carried by said spindle member and mounted in a position for retractive movement into unified consecutive contacts with the radially innermost edges of each and all successively lowest records of said stack—including the last uppermost thereof—until their transposal normally to their playing positions, said contacting member forming one component of a pressure switch which, in the thus depressed position of the contacting member, maintains a closed electrical circuit, and, in the undepressed position of said member, breaks said circuit to automatically stop said phonograph; and means by which the respective record supporting and releasing elements, said spindle-rotating means, said record-reproducing means, and said means to move the latter to and from said record path are mechanically entrained for normal cyclical operation with respect to one another until idled by the release of pressure against said record-contacting member.

18. In a phonograph of the type having a vertically erect spindle member within the confines of which record-changing mechanism is housed, the combination including: the said spindle member, over the freely disposed upper end of which centrally apertured record discs are coaxially deposited at a reservoir station therefor; a turntable in concentric relation to said spindle; means, extensible from said spindle, to receive and to individually releasably support a coaxial assembly of such records in concentric relations about said spindle at said reservoir station and above said turntable; record-rotating and record-playing means; and means to start said phonograph to inaugurate a record-rotating and record-playing cycle, as well as to actuate said record-supporting means to drop successive lowermost records from said reservoir station to said table: said starting means including a depressible contact member carried by said spindle member at the general location of said reservoir station—in a position for movement therefrom outwardly, retractively, depressibly, into the travel path of individual records comprising said assembly incidental to their occupancy of their respective reservoir positions before passage thence to respective playing positions on and above said table; said contact member forming one component of a pressure switch which, in the depressed position of the contact member, closes an electric circuit to automatically inaugurate a record-transposing, record-rotating and record-playing sequence.

19. As a new class of phonograph, the combination of instrumentalities which includes: an elongate spindle member over one end of which centrally apertured disc records are threaded; a plurality of spaced apart separate sets of supports, upper and lower, for respective records on said spindle, upon each of which separate sets of supports, in turn, the record discs are carried releasably, rotatively, in record playing positions, said supports being mounted for cyclical movements retractively outwardly from within the exterior configuration of said spindle member; and a plurality of tone-arm pickup members comprising respective means for transcriptively contacting and playing said discs—one of said tone-arm pickup members corresponding to one side, only, of each such record, and another corresponding to the opposite side, only, thereof then thus supported, rotated and transcribed.

20. In a phonograph which features a spindle member having, at all times, a vertically erect, freely disposed upper end thereof over which disc records are threaded, improvements in combination which include: means to support a record disc in its normal position to be transcribed initially on but one side thereof; a second means for the support of said disc in a normal other position thereof, vertically spaced from said first named position by at least the thickness of a single record, while being transcribed without reversal on the opposite side thereof; means to cause transposal of such record from one of its said transcriptive positions to the other; and at least one tone-arm-and-pickup member entrained in a manner to transcriptively contact said record, at respective intervals of time, while occupying first one and then the other of said first and said second named transcriptive positions; each of said first and said second named record supporting means being extensible directly, retractively, from said spindle.

21. In a phonograph, the combination including: a spindle member over the normally continuously erect and freely disposable upper end of which centrally apertured disc records are threaded downwardly to their reservoir positions; means extensible from within the exterior bounds of said spindle for supporting successive lowermost records releasable from said means, and from their reservoir positions, to at least one individual record-playing position therebelow; a second record-supporting-and-releasing means at said individual record-playing position; at least a third record-supporting-and-releasing means extensible retractively from within the external configuration of said spindle, said latter means being spaced vertically downwardly not less than the full thickness of a single record from the second named thereof; auxiliary means to cause such records, one at a time, to descend by gravity from one to another of the defined record-supporting-and-releasing means; and record-reproducing means movable into respective positions to contact and to initially play one side of each record of a given plurality thereof while in a first transcriptive position thereof, and, thereafter, its opposite side following its arrival at said third named record-supporting-and-releasing means.

22. In phonographic apparatus, the combination including a spindle member over one end of which centrally apertured disc records are threaded; a first support means for such records in their pre-transcriptive reservoir positions about said spindle; another supporting means therefor in their currently fully played positions, while still concentric about a lower shank portion of said spindle member; and means intermediary of said "first" and said "another" record support, extensible laterally outwardly from and retractable to said spindle on which an individual record is received, singly solely supported, and normally individually transcribed on both upper and lower sides thereof; said intermediary means being sufficiently spaced from respective currently unplayed and currently played records resting on the said first and said another supporting means to afford adequate clearance for reproducer means to normally engage the respective upper and lower sides of said individual record in its transcriptive position.

References Cited by the Examiner

UNITED STATES PATENTS

| | | | |
|---|---|---|---|
| 785,191 | 3/1905 | Berliner | 274—42 |
| 870,961 | 11/1907 | Hoffman | 274—42 |
| 897,765 | 9/1908 | Morin | 274—10 X |
| 1,120,841 | 12/1914 | Norris | 274—36 |
| 1,227,023 | 5/1917 | Underhill | 274—1 |
| 1,262,521 | 4/1918 | Knights | 274—10 |
| 1,320,639 | 11/1919 | Mott | 274—42 |
| 1,390,041 | 9/1921 | Kenny | 274—42 X |
| 1,568,130 | 1/1926 | Blackwell | 274—10 |
| 1,719,184 | 7/1929 | Koester et al. | 274—10 |
| 1,776,097 | 9/1930 | Baird | 274—42 X |
| 1,792,159 | 2/1931 | Gonzalez | 274—42 |
| 1,834,886 | 12/1931 | Barton | 274—42 X |
| 1,915,348 | 6/1933 | Acheson | 274—42 |
| 1,926,606 | 9/1933 | Ward | 312—10 |
| 1,954,247 | 4/1934 | Jones et al. | 274—10 |
| 1,969,895 | 8/1934 | Loughridge | 274—42 |
| 2,043,789 | 6/1936 | Ansley | 274—1 |
| 2,068,449 | 1/1937 | Downs | 274—1 |

(References on following page)

UNITED STATES PATENTS

| | | | |
|---|---|---|---|
| 2,132,993 | 10/1938 | Mitchell | 274—10 |
| 2,146,434 | 2/1939 | Jacobs | 274—10 X |
| 2,159,836 | 5/1939 | Alms | 274—10 |
| 2,205,268 | 6/1940 | Mitchell | 274—10 |
| 2,279,851 | 4/1942 | Waln et al. | 274—10 |
| 2,287,098 | 6/1942 | Habegger | 274—10 |
| 2,302,503 | 11/1942 | Proctor | 274—39 |
| 2,309,197 | 1/1943 | Lewis | 274—10 |
| 2,309,276 | 1/1943 | Roberts | 274—42 |
| 2,402,746 | 6/1946 | Goldich | 312—10 |
| 2,435,264 | 2/1948 | Ansar | 274—10 |
| 2,472,964 | 6/1949 | Walker | 274—10 |
| 2,479,894 | 8/1949 | Andrews | 274—36 |
| 2,500,773 | 3/1950 | Robins | 312—10 |
| 2,503,609 | 4/1950 | Barnhart | 274—42 |
| 2,506,926 | 5/1950 | Johnson | 274—10 |
| 2,512,701 | 6/1950 | Weaver | 274—10 |
| 2,515,283 | 7/1950 | Wissner | 274—10 |
| 2,536,477 | 1/1951 | Vistain | 274—10 |
| 2,544,010 | 3/1951 | Giannantonio | 274—42 |
| 2,550,794 | 5/1951 | Fisher | 247—10 |
| 2,555,594 | 6/1951 | Markovitz | 274—42 |
| 2,555,895 | 6/1951 | Lynch | 274—10 |
| 2,559,786 | 7/1951 | Mueller | 274—39 |
| 2,621,047 | 12/1952 | Carreau | 274—39 |
| 2,626,157 | 1/1953 | Jablonski | 274—105 |
| 2,634,135 | 4/1953 | Carson | 274—10 |
| 2,643,127 | 6/1953 | Gregg et al. | 274—105 |
| 2,643,129 | 6/1953 | Habegger | 274—105 |

FOREIGN PATENTS

| | | |
|---|---|---|
| 882,026 | 12/1937 | France. |
| 884,356 | 8/1943 | France. |
| 555,632 | 7/1932 | Germany. |
| 541,156 | 11/1941 | Great Britain. |
| 111,950 | 9/1944 | Switzerland. |

NORTON ANSHER, *Primary Examiner.*

GEORGE WESBY, BENNETT G. MILLER, DAVID J. GALVIN, JOHN C. MACNAB, NEWTON N. LOVEWELL, ARNOLD RUEGG, *Examiners.*

R. E. AUSTIN, E. F. MALIN, C. B. PRICE, *Assistant Examiners.*